United States Patent
Fries

(10) Patent No.: US 7,627,883 B2
(45) Date of Patent: Dec. 1, 2009

(54) INTERACTIVE ENTERTAINMENT AND INFORMATION SYSTEM USING TELEVISION SET-TOP BOX

(75) Inventor: Robert M. Fries, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 203 days.

(21) Appl. No.: 11/491,048

(22) Filed: Jul. 20, 2006

(65) Prior Publication Data

US 2006/0259937 A1 Nov. 16, 2006

Related U.S. Application Data

(60) Division of application No. 09/895,452, filed on Jun. 29, 2001, which is a continuation of application No. 08/882,908, filed on Jun. 26, 1997, now Pat. No. 6,317,885.

(51) Int. Cl.
*H04N 5/445* (2006.01)
(52) U.S. Cl. .............................. 725/50; 725/40; 725/41; 725/42; 725/43; 725/44
(58) Field of Classification Search .................... 725/40, 725/41–42, 43–44, 50
See application file for complete search history.

(56) References Cited

U.S. PATENT DOCUMENTS

| | | | |
|---|---|---|---|
| 4,623,920 A | 11/1986 | Dufresne et al. | |
| 5,559,548 A * | 9/1996 | Davis et al. ................... | 725/40 |
| 5,589,892 A | 12/1996 | Knee et al. | |
| 5,694,163 A | 12/1997 | Harrison | |
| 5,859,967 A | 1/1999 | Kaufeld et al. | |
| 5,903,816 A | 5/1999 | Broadwin et al. | |
| 5,926,603 A | 7/1999 | Tanaka et al. | |
| 5,929,849 A | 7/1999 | Kikinis | |
| 5,929,850 A | 7/1999 | Broadwin et al. | |
| 5,973,681 A * | 10/1999 | Tanigawa et al. ............ | 715/716 |
| 5,982,445 A | 11/1999 | Eyer et al. | |
| 6,005,565 A | 12/1999 | Legall et al. | |
| 6,018,764 A | 1/2000 | Field et al. | |
| 6,028,600 A * | 2/2000 | Rosin et al. .................. | 715/718 |
| 6,047,317 A * | 4/2000 | Bisdikian et al. ............ | 725/142 |
| 6,675,385 B1 | 1/2004 | Wang | |
| 6,732,369 B1 | 5/2004 | Schein et al. | |
| 2002/0035728 A1 | 3/2002 | Fries | |
| 2006/0259921 A1 | 11/2006 | Fries | |
| 2006/0259934 A1 | 11/2006 | Fries | |
| 2006/0259935 A1 | 11/2006 | Fries | |
| 2006/0259936 A1 | 11/2006 | Fries | |
| 2006/0259940 A1 | 11/2006 | Fries | |

\* cited by examiner

*Primary Examiner*—John W Miller
*Assistant Examiner*—Sumaiya A Chowdhury

(57) ABSTRACT

An interactive entertainment and information system using a television set-top box, wherein pages of information are periodically provided to the set-top box for user interaction therewith. The pages include associated meta-data defining active locations on each page. When a page is displayed, the user interacts with the active locations on the page by entering commands via a remote control device, whereby the system reads the meta-data and takes the action associated with the location. Actions include moving to other active locations, hyperlinking to other pages, entering user form data and submitting the data as a form into memory. The form data may be read from memory, and the pages may be related to a conventional television program, thereby providing significant user interactivity with the television.

2 Claims, 13 Drawing Sheets

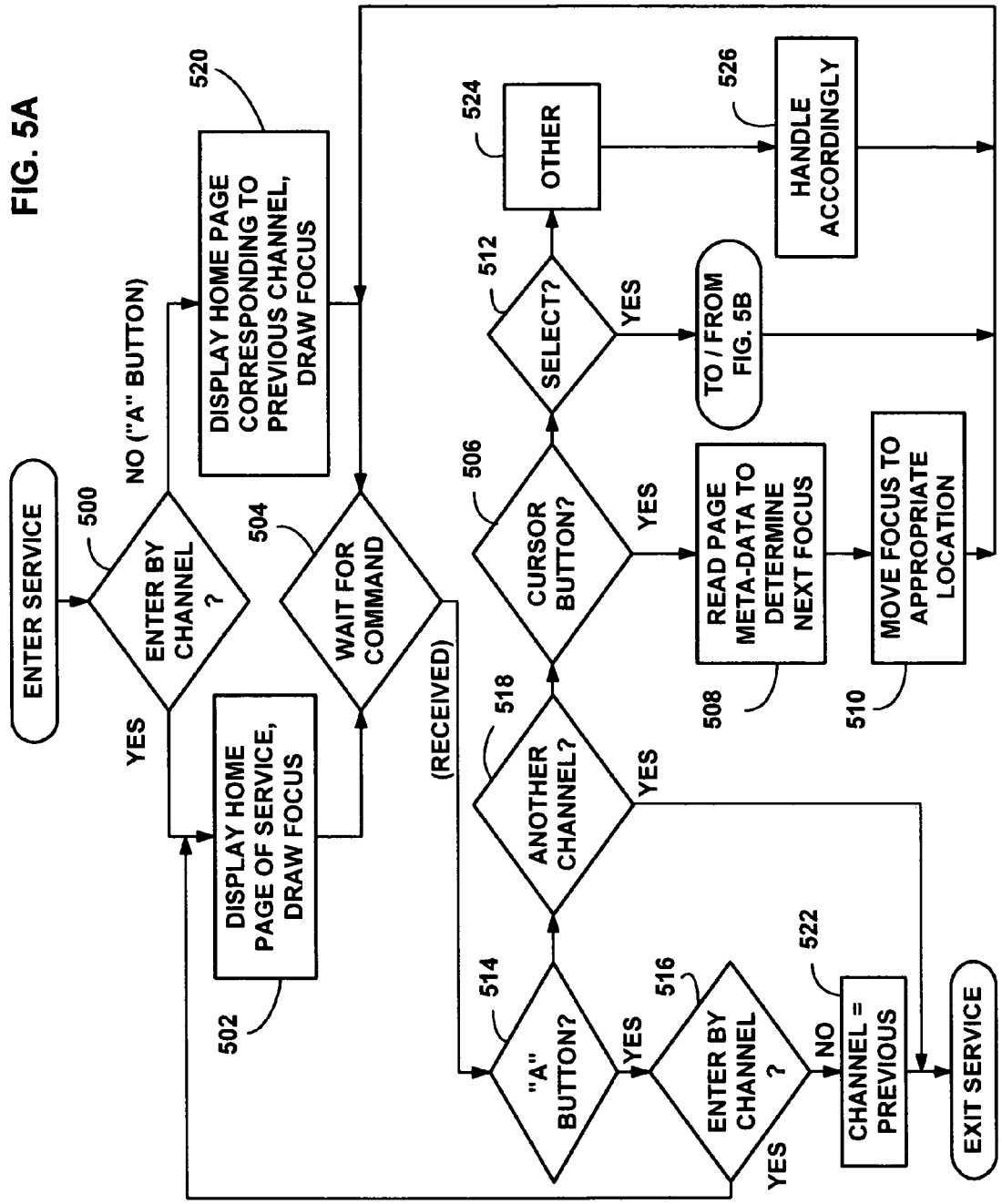

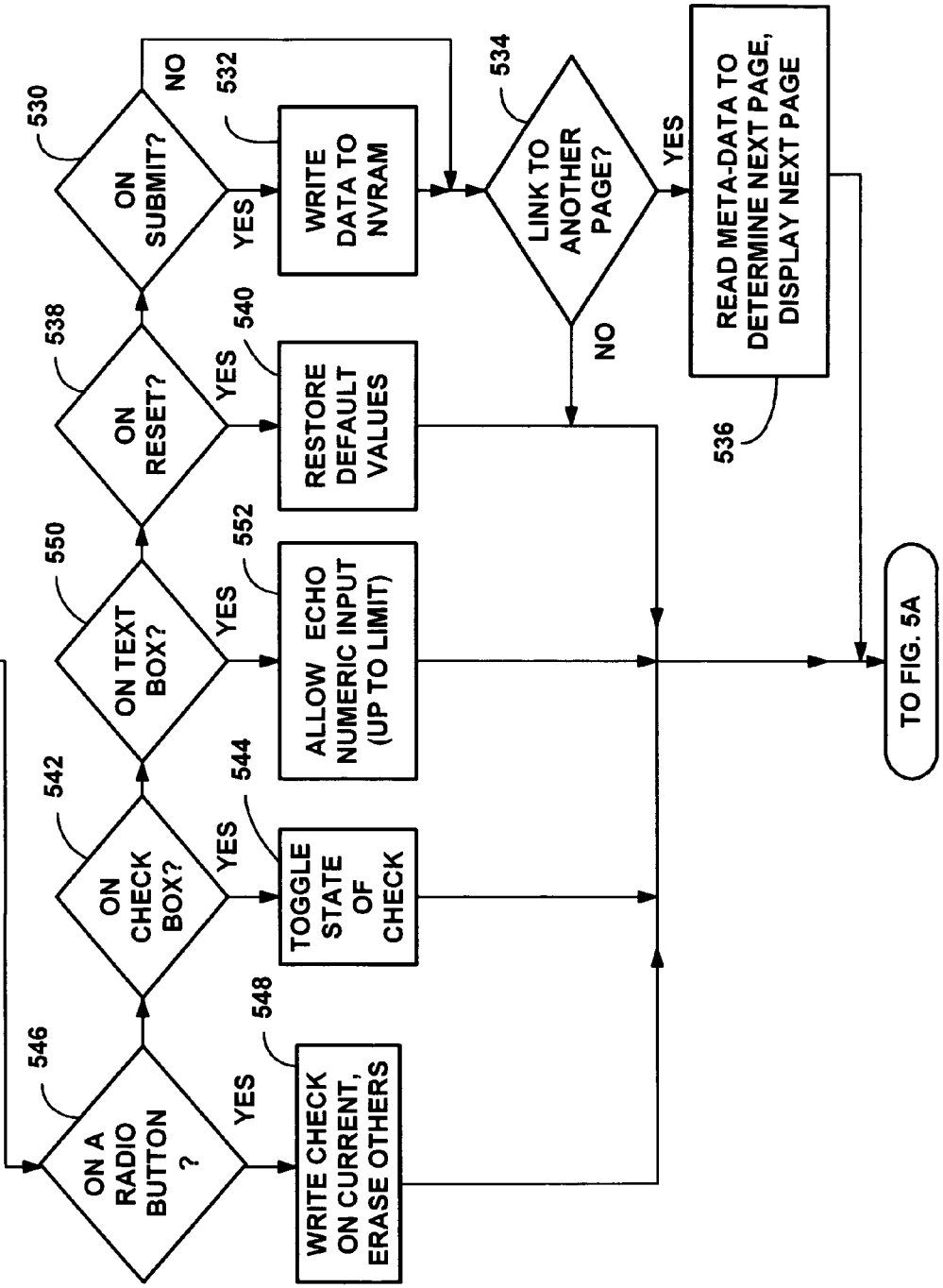

INTERACTIVE ENTERTAINMENT AND INFORMATION SYSTEM USING TELEVISION SET-TOP BOX

CROSS-REFERENCE TO RELATED APPLICATION

The present application is a divisional of U. S. patent application Ser. No. 09/895,452, filed Jun. 29, 2001, which is a continuation of U. S. patent application Ser. No. 08/882,908 filed Jun. 26, 1997, now U.S. Pat. No. 6,317,885.

FIELD OF THE INVENTION

The invention relates generally to interactive television, and more particularly to an interactive entertainment and information system using a cable television set-top box.

BACKGROUND OF THE INVENTION

The existing network of coaxial cable television wiring was once foreseen as providing the primary high-speed infrastructure for linking computers and computerized televisions to sources of information such as the Internet. However, it is becoming apparent that the availability of such cable-based information access will not be realized in the near term, if ever, particularly as competing high-speed transmission media (such as that based on higher quality telephone lines, faster modems and ISDN technology) become entrenched. Indeed, the current economic climate has made it impractical, or at least extremely risky, for cable television service providers to replace their existing base of possibly tens or even hundreds of thousands of receive-only cable set-top converter boxes with computerized transmit-and-receive cable modems. However, such two-way cable modems are needed to provide subscribers with interactive television and a real-time, high-speed link to information services, while simultaneously providing conventional television programming thereon.

At the same time, it is certain that many cable subscribers simply want low-cost television programming. This leaves cable providers with the dilemma of losing subscribers if they raise prices in order to upgrade their systems, or being left behind by new competitors and competing technologies if they do not. One solution is to convert to new technologies gradually. For example, conventional television programming can now be transmitted over cable in a digital format, enabling the transmission of many more (virtual) channels on the same bandwidth cable. Rather than force all subscribers to convert to the digital format, however, cable service providers will transmit a mixture of analog and digital signals for a period of time. This reduces the total number of channels transmitted to less than the maximum possible allowed by the bandwidth, but allows the cable companies to keep subscribers who are reluctant to convert.

Regarding information services on the television, a number of low-cost devices presently exist for allowing access to information services using a television set instead of a computer monitor. However, these devices do not approach interactive television, but instead do little more than use the television display as an inexpensive monitor while connecting to the information service via a conventional, telephone-based modem. As a result, with such a device there is no direct connection between programs transmitted to a viewer and interaction with web pages or the like about those programs. For example, a viewer of a home shopping channel wishing to purchase a displayed item cannot simply do so with the low cost-device, but instead must first connect to the information service (e.g., the Internet) via the user's service provider, find the shopping channel's web-site (if one exists), find the appropriate item (if available on the web-site) and then place the order. Most significantly, these devices tie up a telephone line for long periods of time, a significant drawback in many households.

OBJECTS AND SUMMARY OF THE INVENTION

Accordingly, it is a general object of the present invention to provide an interactive entertainment and information system using a cable television set-top box.

A related object is to provide the above system using existing digital set top boxes without need for modification of the hardware therein.

Another object is to provide a system as characterized above that enables a user to hyperlink between pages of information.

Yet another object is to provide a system of the above kind that facilitates an interactive relationship between transmitted programming and information pages related thereto.

A related object is to allow a user to submit form information, including forms related to a viewed television program.

In accomplishing those objects, another object is to provide a simple to operate, low cost information service to those users desiring same.

Still another object is to provide a system of the above kind that is flexible and extensible.

Briefly, the present invention provides an interactive television system including a head-end having means for injecting video information into a transmission medium. The video information includes a plurality of page images. Detection means at a subscriber end, such as hardware and software in a cable set-top box in conjunction with a remote control device, detect a first request to display one of the plurality of page images. Upon detection of the first request, the box selects and displays the page image, wherein the page image includes at least one active location, such as a link, having an action corresponding thereto. The detection means further detects a second request to take the action that corresponds to the active location, whereupon the action is taken. For example, a new page might be displayed when a link is selected. The video information includes meta-data or the like associated therewith for providing information about the active location and the action to be taken upon selection thereof. Other actions may include those related to form entry and submission of form data.

Other objects and advantages will become apparent from the following detailed description when taken in conjunction with the drawings, in which:

BRIEF DESCRIPTION OF THE DRAWINGS

FIGS. 5A-5B comprise a flow diagram representing the general steps taken by a browser to access an information service in accordance with one aspect of the present invention;

DETAILED DESCRIPTION OF THE PREFERRED EMBODIMENT

I. Overview

A basic feature of the Information Service architecture described below is the ability to deliver a stream of MPEG still images, or image pages, to a cable user (subscriber). Associated with these high-quality pages is a set of meta-data describing links to other pages along with a limited set of side effects and actions. The user can select and activate the links with a hand-held remote control, thereby interacting with the pages of information displayed on the television screen.

II. The Head-End

Figure 1:
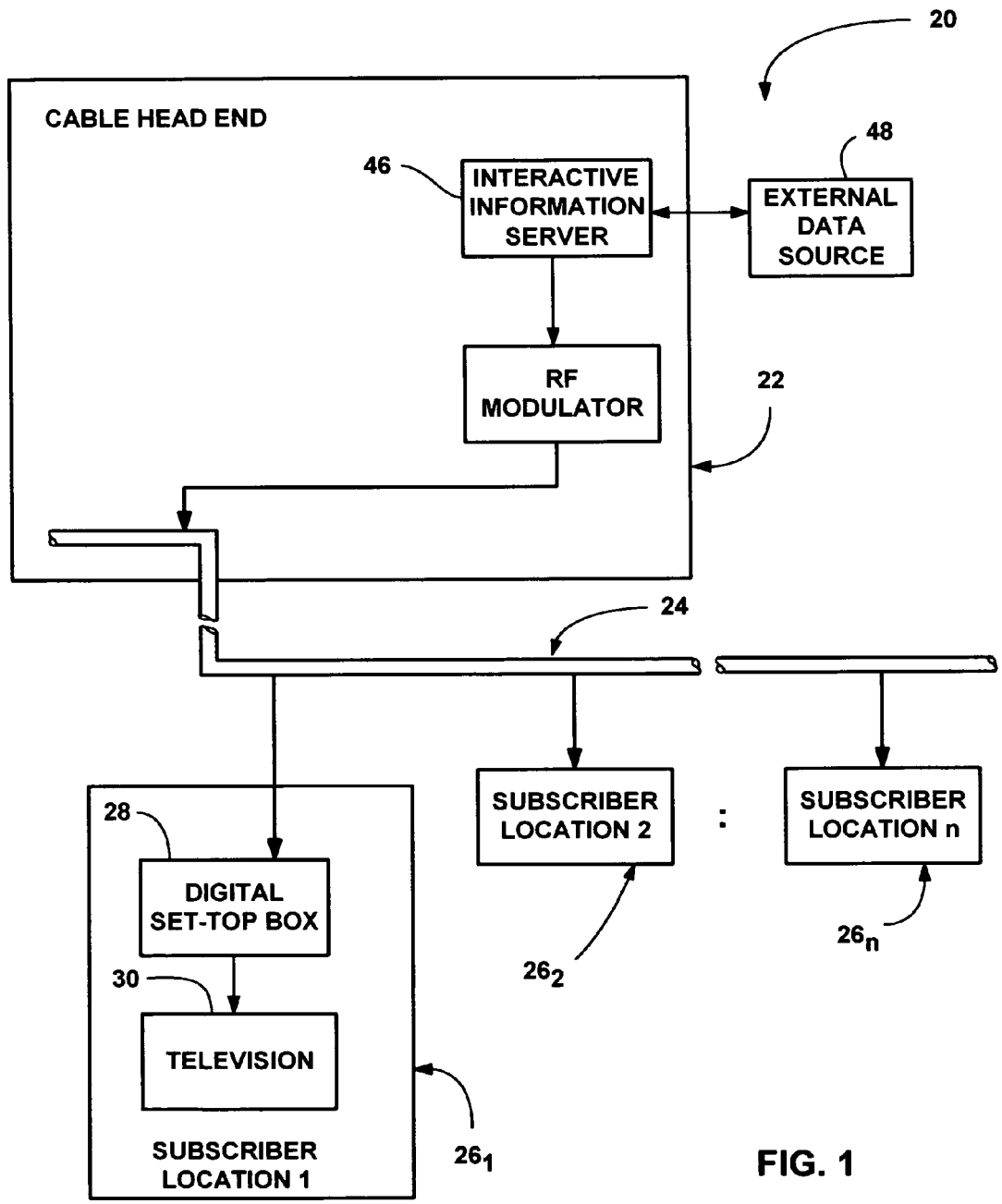
FIG. 1 is a block diagram representing a cable television system in which the present invention may be incorporated.

Turning to the drawings and referring first to FIG. 1, there is shown a system generally designated 20 into which the present invention may be incorporated. In general, the system 20 transmits signals comprising video and audio information from a cable head-end 22 onto a coaxial cable transmission medium 24, the signals being received at a plurality of subscriber locations $26_1$-$26_n$. Signal boosters (not shown) may be provided for amplifying and distributing the signals to the plurality of locations. At least one of the subscriber locations, such as the location $26_1$, includes a digital set-top box 28 or the like equipped to convert the transmitted signals into signals capable of being received by a standard (e.g., NTSC) television set 30 for displaying video images and/or outputting audio to a consumer end-user. Of course, the present invention does not require coaxial cable as the physical transmission medium, as signals can alternatively be transmitted over any transmission medium, including wireless means such as so-called "wireless cable" broadcasts, digital satellite communication, and so on.

Figure 2:
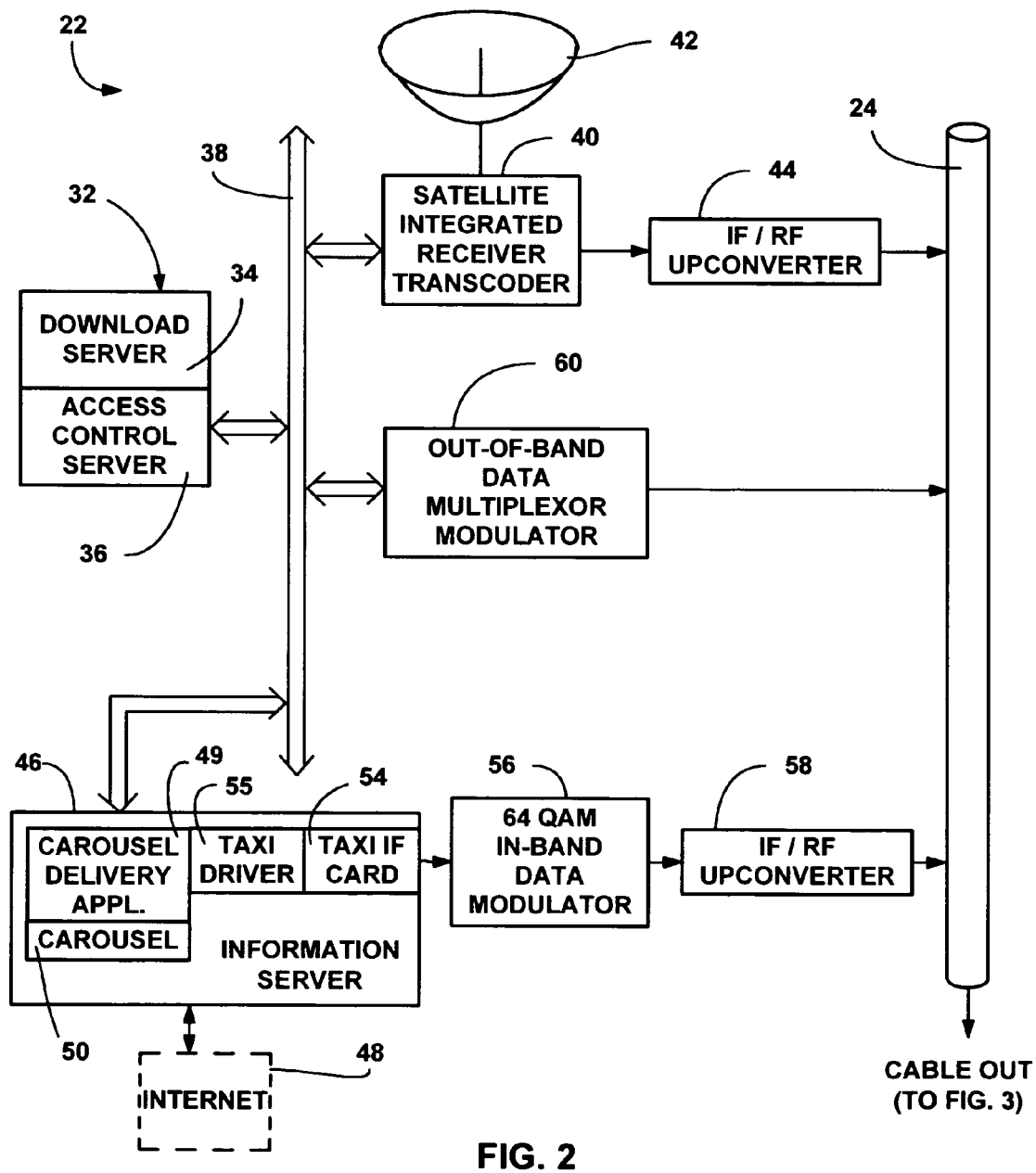
FIG. 2 is a block diagram representing a head-end of a cable television system in accordance with the present invention.

As shown in more detail in FIG. 2, the head-end 22 includes a head-end LAN 32, including a download server 34 and an access control server 36, for controlling the operation of the head-end 22 via an Ethernet connection 38 to the various components therein. One of the components connected to the LAN is a satellite integrated receiver/transcoder 40, which, as is known, receives and encodes digital television programming signals such as originating from microwave broadcasts received via a satellite antenna (dish) 42. One such receiver/transcoder 34 is manufactured by General Instrument Corporation, Model No. IRT 1000, and outputs twenty-seven megabits per second (27 Mb/s) MPEG2 transport streams modulated onto a forty-four megahertz intermediate frequency carrier. In turn, the MPEG2-encoded transport streams are received by an intermediate frequency to radio frequency (IF/RF) upconverter 44, (General Instrument Corporation, Model No. C6U), which modulates the streams onto six megahertz (analog) channels and injects the signals onto the cable transmission medium 24. With multiplexing of multiple, packetized digital signals per six megahertz analog channel, hundreds of digital channels may be injected onto a single coaxial medium, although at present a mixture of analog and digital channels will likely be transmitted.

According to one aspect of the invention and as described in more detail below, in addition to conventional television programming, the cable head-end 22 outputs a plurality of still images, or information pages to information service subscribers. To this end, the cable head-end 22 includes an information server 46. The primary function of this head-end server 46 of the Information Service is to receive and store page data and carousel management information from content providers, and then to inject the page images onto the local cable system, i.e., produce a real-time carousel data stream for modulation onto a six megahertz channel of the transmission medium 24. The server 46 may have the page image data permanently stored therein, but typically will regularly download at least some of the page image data from an external data source 48 such as the Internet. As described below, the subscriber can interact with the digital set-top box 28 to selectively display the various page images on the screen of the television set 30.

Figure 3:
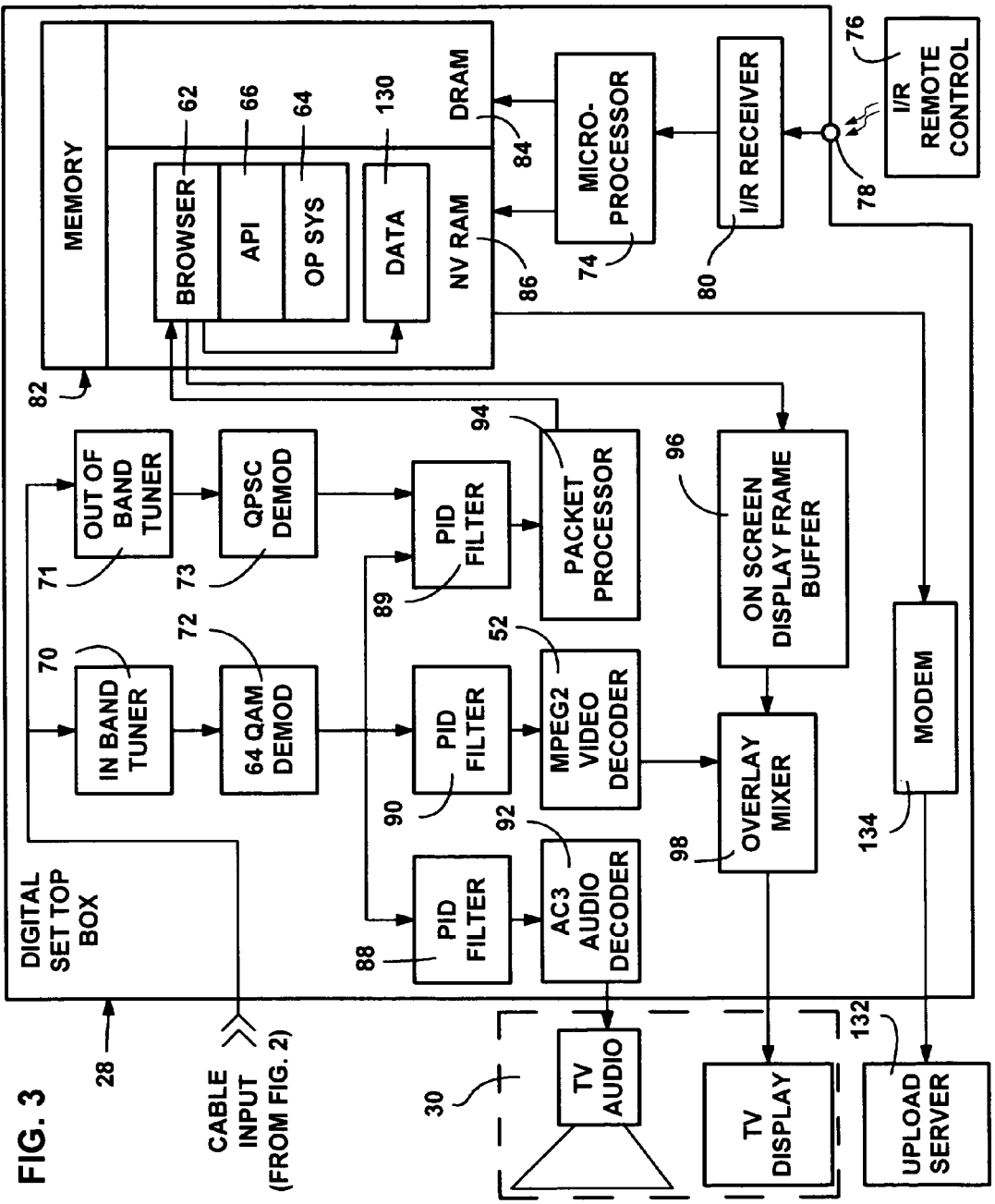
FIG. 3 is a block diagram representing a digital set-top box for receiving cable transmissions at the subscriber end of the cable television system of FIG. 1.

More particularly, the information service server includes a carousel delivery application 49 for delivering a carousel 50 (FIG. 2) of rendered HTML page images to the set-top box 28 along with meta-data for each page. Each page image consists of a single frame MPEG2 video sequence that is capable of being decoded by an MPEG video decoder 52 in the set-top box 28 (FIG. 3). The meta-data for each page describe the structure and contents of the page image. As described above, the carousel 50 of page images and meta-data are delivered to a client set-top-box 28 as a standard MPEG2 Transport Stream, broadcast in-band over a six MHz NTSC channel.

The preferred head-end interactive information server 46 comprises a rack-mounted personal computer, including an Intel Corporation P6 200 megahertz (or better) central processing unit, 128 megabytes of RAM, a two gigabyte or larger hard disk drive, and an ISDN or better connection to the external data source (Internet) 48. The server 46 also includes an Ethernet connection 38 to the local head-end LAN 32, and a TAXI (serial protocol) interface card 54 (FIG. 2) along with an appropriate TAXI driver 55 therefor. The operating system is Windows NT Server 4.0. Although only one such server 46 is necessary for a typical head-end 22, two information service servers may be installed in a head-end for purposes of increased reliability based on redundancy. For redundant systems, the NT Servers will run Microsoft Clustering software.

As shown in more detail in FIG. 2, to inject the signals, the information server 46 is connected via its taxi interface card 54 (on copper) to an in-band data modulator 56 connected to an intermediate frequency to radio frequency upconverter 58. The preferred in-band data modulator 56 is manufactured by General Instrument Corporation, model number IM-1000, which accepts 27 Mb/s transport streams from the information service server 46 and encodes and modulates those signals to a 44 MHz intermediate frequency. As with the redundant servers, there may be two IM-1000 in-band data modulators.

A second IF/RF Upconverter 58 (General Instrument Corporation, Model No. C6U) converts the 44 MHz intermediate signal to an RF signal and injects the RF signal into the cable system's transmission medium 24. In this manner, the 27 Mb/s MPEG2 transport streams containing page images originating from the information server 46 are modulated onto a six megahertz analog channel for reception by subscribers.

Lastly, the head-end 22 includes an out-of-band data multiplexor 60 (General Instrument Corporation, Model No. OM-1000) which is a required component of virtually any head-end 22. As is known, the out-of-band data multiplexor 60 may be used by the present information service to communicate information service-related data to the cable network. This data, including channel maps and possibly email as described below, is routed through the cable nation data center, and is thus only indirectly related to the operation of the information service head-end 22.

III. The Subscriber End

A. Hardware

Turning to the subscriber end of the system 20, as best shown in FIG. 3, the preferred set top box 28 is a digital set top box manufactured by General Instrument Corporation, Model No. DCT-1000. Although not necessary to the invention, it is significant that with this particular set-top box the hardware is unmodified, so that the existing base of publicly distributed set-top boxes may implement the Information Service without requiring upgrade servicing or replacement. However, to provide the service in accordance with the present invention, the operation of the box 28 is modified by additional software downloaded thereto. Such software includes a browser 62 which communicates with an operating system 64 of the box 28 by placing calls through an application programming interface (API) 66, as described in more detail below.

As shown in FIG. 3, the digital cable box 28 includes an in-band tuner 70 and an out-of-band tuner 71, along with appropriate demodulators 72 and 73, respectively. A microprocessor 74 controls the tuning operation of the tuners 70 and 71 based on commands received from a subscriber via an input device such as a keypad or an infrared remote control device 76, as described below. To this end, the set-top box 28 includes an infrared sensor 78 connected to an infrared receiver 80 which provides the command signaling information to the microprocessor 74. A memory system 82 includes the VRTX operating system 64 stored therein, and preferably comprises a combination of volatile dynamic RAM 84 and non-volatile RAM (NVRAM) 86.

In accordance with digital broadcasts wherein digitized channels are multiplexed as data packets onto a six megahertz analog channel, the set-top box 28 also includes at least three packet identification (PID) filters 88-90 to extract the appropriate encoded data packets for a user-selected digital channel. Based on the user-selected display, audio and other requirements, the microprocessor 74 writes an identification value to each of the PID filters 88-90, whereby the filters 88-90 pass only those packets corresponding to that value. As shown in FIG. 3, one of the PID filters, filter 88, provides the filtered packets to an audio decoder 92 which decodes the digital audio data (encoded according to the AC3 format), while another PID filter 90 provides filtered packets (MPEG2 encoded) to the video decoder 52.

As can be readily appreciated, in addition to line-level audio and video outputs, the resulting video signal may be output from the set-top box 28 with separate luminance and chrominance signals (SVHS format). As is typical, the set-top box 28 may also contain a modulator (not shown) for combining the audio and video signals onto a modulated carrier channel such as channel 3 or 4, for compatibility with television sets not having separate audio and video inputs.

A third PID filter 89 is provided to extract in-band and out-of-band data directed to the operation of the set-top box 28. A packet processor 94 handles those packets. The set-top box is also equipped with an on-screen display frame buffer (OSD) 96 capable of superimposing alphanumeric characters, other symbols and bitmap graphics over a displayed image. To accomplish this superimposition, an overlay 98 is provided to appropriately combine the video outputs of the video decoder 52 and the OSD 96.

The cable box 28 functions when the user provides an appropriate and valid command to the cable box 28. For example, in response to a digital channel selection command, the microprocessor tunes the in-band tuner 70 to an appropriate analog channel based on the digital channel selected by the subscriber. If a digital channel was selected, a table or the like stored in the memory 82 determines the analog channel that carries the digital channel's packets, along with the packet identification numbers corresponding to that channel, for writing into the PID filters 88 and 90. Once the PIDs have been written, the audio and video decoders 52 and 92 will receive the appropriate packets and decode and output appropriate signals. As described below with reference to the present invention, some of the packets will include page images associated with the information service.

Figure 4:
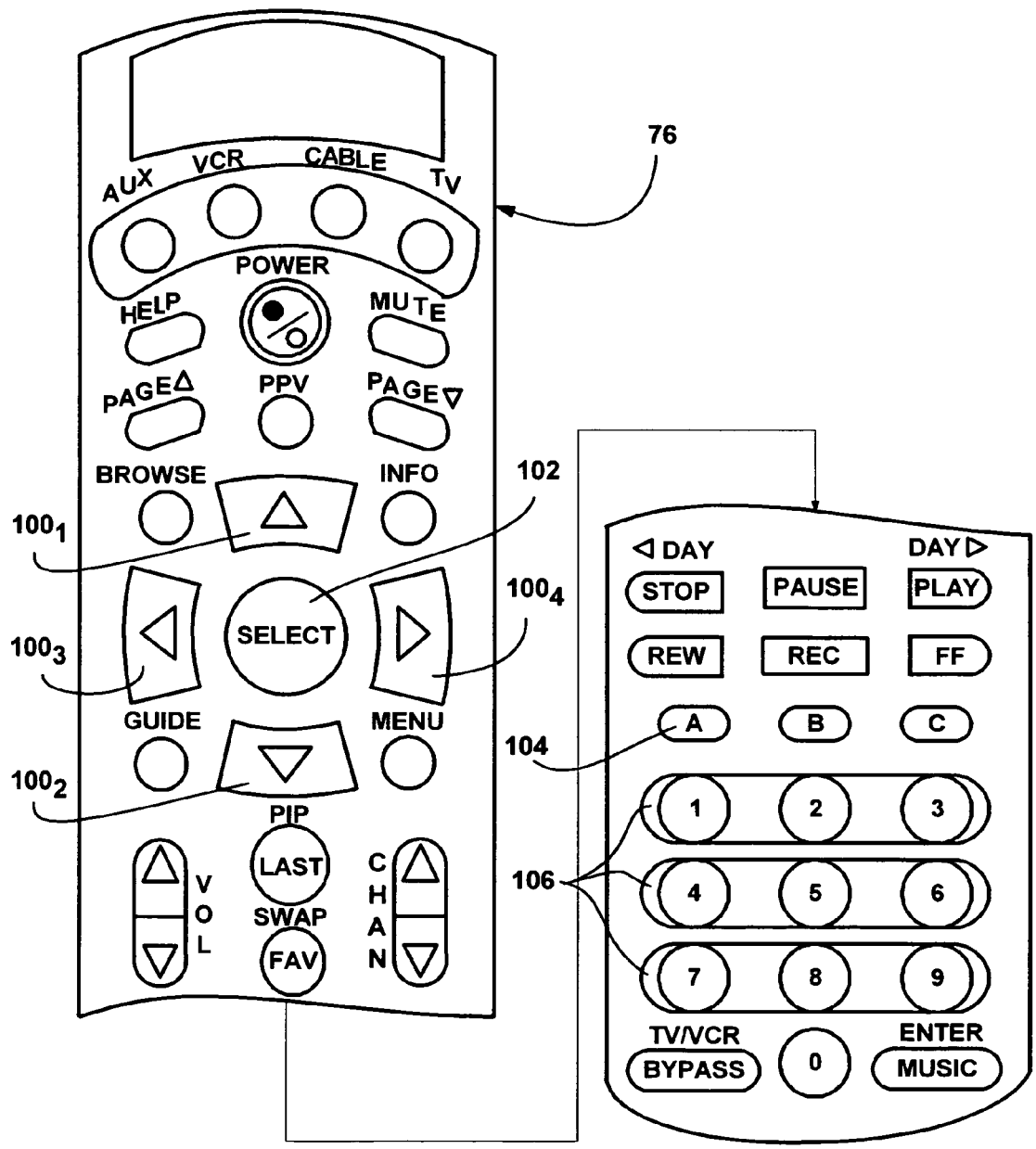
FIG. 4 is a diagram of an exemplary remote control device for providing user-commands to the digital set-top box of FIG. 3.

The subscriber also will be provided with an input device, such as the hand-held remote control 76 best shown in FIG. 4. The preferred input device 76 includes four directional (up, down, left and right cursor) buttons, $100_1$-$100_4$ respectively, and a "SELECT" button 102. The remote control 76 may include a dedicated button, chosen as the "A" button 104 of FIG. 4, which may be used to enter the information service in one alternative scenario described below. The preferred remote control input device 76 will also provide the normal complement of TV-related buttons including a numeric keypad 106, volume adjustment, channel adjustment, mute and so on. Other buttons such as those for control of a videocassette recorder also may be provided. The remote control is preferably wireless, e.g., an infrared or RF-based remote control, but of course alternatively may be wired. Moreover, alternate input devices need not be remote, but may for example, be provided as a keypad (not shown) on a set-top box.

B. The Browser

In accordance with one aspect of the invention, the user utilizes the set-top box 28 to enter and interact with the Information Service. To this end, the browser 62 has been downloaded into the memory 82 of the set-top box 28, along with APIs 66 for interfacing the browser 62 to the operating system 64 of the set-top box 28. The operation of the browser 62 is generally described herein with reference to the flow diagram of FIGS. 5A-5B.

In one scenario, when the subscriber, via the remote control 76, tunes to a specified (and otherwise unused for programming) channel reserved for the Information Service, the browser 62 provides the subscriber with a page image having page elements displayed thereon including links to other information. The page images are obtained from the external data source 48, ordinarily the Internet, and are Hypertext Markup Language (HTML) pages provided by a third party that have been converted to an intermediate format as described below. For example, television stations, advertisers, pollsters and the like may obtain rights to have one or more page images transmitted on the cable medium 24 for potential viewing by the consumer end-user.

As shown by steps 500-502 of FIG. 5A, the initial page image is preferably a default (home) page that is displayed when this particular Information Service channel is selected.

Another page based on information known to the system, such as a page corresponding to the previous channel being viewed by the user, may be displayed when the user enters this channel. Although not necessary to the invention, it is feasible that more than one such channel may be provided for entering the information service, with a potentially different initial page for each channel.

Figure 6:
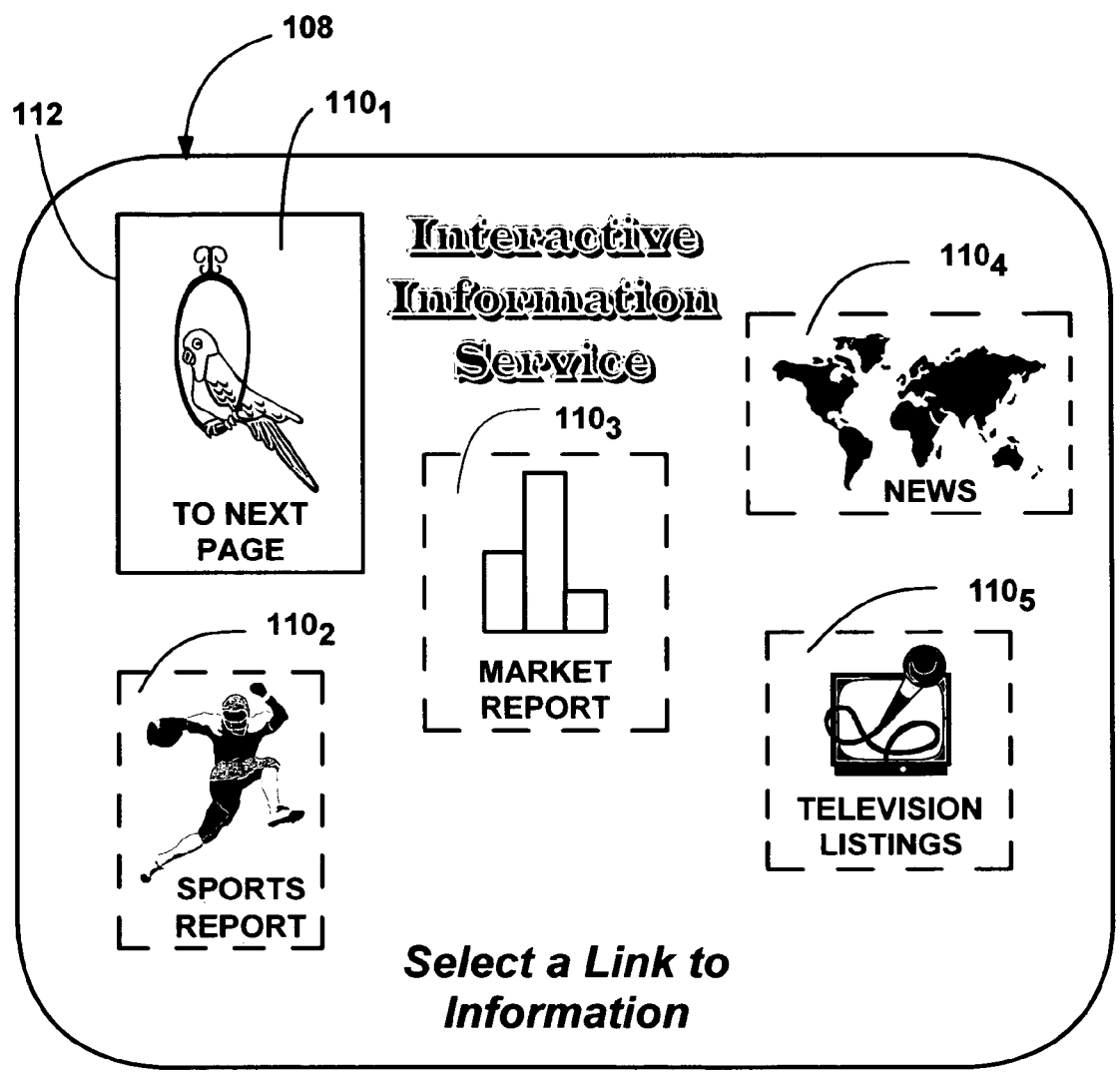
FIG. 6 is a representation of an exemplary page image having page elements thereon.

By way of example, the image 108 of FIG. 6, including a number of links 110$_1$-110$_5$, may be the default page displayed when channel 99 is selected. For visibility purposes, the cable box 28 utilizes the on-screen display (OSD) 96 to draw focus (e.g., denoted in FIG. 6 by the visible ring, i.e., box 112 or the like) on one of the links when the page 108 is displayed. Other elements which can be focused are shown in FIG. 6 as being surrounded by dashed boxes (not ordinarily visible to an actual user). As shown by step 504, the browser 62 then waits for a command from the user. One such command is entered as the user presses one of the directional cursor buttons 100$_1$-100$_4$ on the remote control 76 (FIG. 4).

As detected by step 504 and 506, when the user presses a directional cursor button 100$_1$-100$_4$, at step 508 the browser 62 reads the meta-data associated with the displayed page to determine how to adjust focus, (described below), and then draws the focus at the next location at step 510. In this manner, the user tabs through the links 110$_1$-110$_5$, changing the focus until a desired link is focused. Then, using the SELECT button 102 (FIG. 4) of the remote control 76, (as detected by steps 504 and 512 of FIG. 5A), the user commands the browser 62 to take an action associated with the focused link. Examples of some possible actions are represented in FIG. 5B, and include hyperlinking to another display page, filling in a check-box, submitting a form, and so on as described in more detail below.

If the user pushes the "A" button 104 on the remote control 76, step 514 detects this command. Since the user entered the Information Service via the service's specific channel, step 516 returns the user to step 502 which displays the default page of the Information Service. In other words, pressing the "A" button in this scenario returns the user to the home page of the service. The user exits the service in this scenario by entering another channel, as detected by step 518.

In another scenario, the user is watching programming on a specific channel that participates in the Information Service. If the user pushes the "A" button 104 on the remote control 76 (FIG. 4) at any time while viewing such a participating channel, as detected by step 500, an initial page image (the "top-level" page) corresponding to that channel is displayed (step 520), along with links to other pages. For example, (assuming station participation), a user viewing ESPN will be shown an ESPN top-level page when the "A" button 104 is pressed. As before, if the top-level page provides links, the user can select from among those links and jump to other pages from that top-level page, but in this scenario those links ordinarily connect to only a small number of pages that are recognized as being "tied" to the original video channel. The user can exit the service by changing to another channel (step 518), or by again pushing the "A" button 104 (step 514). Note that in this scenario, step 516 does not display the home page when the "A" button is detected, but instead branches to step 522 where the set-top box is returned to the previous channel and the service is exited.

Moreover, if the service was entered via the "A" button 104 (FIG. 4), the act of changing the channel resets and exits the Information Service. For example, if a page image page corresponding to a participating channel is being displayed, and the user changes to another channel but then returns to the original channel, the video program of the original channel will be displayed, not the page corresponding thereto.

Note that if another command is entered, (e.g., a PLAY command corresponding to a video recorder), the command can be handled by the browser 62 as desired. For example, the command can be treated like a channel selection (exiting the service) or just ignored. Steps 524-526 are shown to generally represent receipt of such a command.

In any event, if the user selects a page in the service and does not immediately select a link, it is possible for the page image to be updated at a frequency equal to the maximum initial latency of the carousel 50. At present, a nominal maximum latency for an image to cycle back for display is about eight seconds, but this is variable depending on the amount of carousel bandwidth dedicated to a given page. More particularly, a frequently accessed page may be placed in the carousel 50 more than once at spaced-apart locations to reduce the latency for that page by increasing its frequency therein. For example, the service home page may be placed in the carousel 50 four times, providing a maximum latency of approximately two seconds for that page.

To facilitate the user interaction, once the service has been entered and a page is displayed, (step 502 or step 520), using the OSD 96, the browser 62 in the digital set-top box 28 draws focus on the first page element listed in a FocusDescriptor list in the meta-data (described below) associated with that page. The geometry (shape) of the indicator (i.e., the focus ring) drawn by the OSD 96 is also determined by information in the FocusDescriptor list. It is also feasible to specify the color, shading and the like of the focus ring in the meta-data.

As described above, the user may change the focus via the direction buttons 100$_1$-100$_4$ on the remote control 76, whereby the focus is re-drawn on the appropriate element (step 510). More particularly, the order of changing focus in response to a directional button, i.e., the focus chain, is specified by the focus descriptors that are carried in the page meta-data. The focus descriptors explicitly specify where focus should be next drawn when the user depresses the up, down, left or right buttons 100$_1$-100$_4$ on the remote control device 76. For remote controls lacking direction keys, a single button can be used to tab through the links, in which event the order in which the focus descriptors occur in the focus descriptor list determines the focus chain.

In either arrangment, while focus is rendered on a particular element, the user may select that element by pressing the SELECT button 102 on the remote control 76 (step 512), or an equivalent button (e.g., ENTER button) available on other devices. Regardless of how selected, when the element is selected, the browser 62 takes an appropriate action. The following table summarizes the actions taken by the browser for various types of page elements.

| Element | Tag | Drawing Required | Browser action |
|---|---|---|---|
| Text Anchor | <A HREF=url> anchor text </A> | Focus | On selection jump to page indicated by URL. |
| Image Anchor | <A HREF=url> <IMG SRC=url> </A> | Focus | On selection jump to page indicated by URL. |
| Client Image Map | <AREA SHAPE=shape COORD=coord HREF=url> | Focus | On selection jump to page indicated by URL. |
| Automatic Hyperlink | <META HTTP-EQUIV= REFRESH CONTENT="delay; URL=url"> | None | Jump to page indicated by URL automatically after delay (in seconds). |
| Guide Hyperlink | <A HREF=url> GUIDE </A> | Focus | On selection pass the URL string to the GUIDE. |
| One Line Text | <INPUT TYPE=TEXT> | Focus "0"-"9" | Echo numerals when they are entered on the keypad. No action on selection. |
| Password | <INPUT TYPE=PASSWORD> | Focus "*" | Echo "*" when numerals are entered on the keypad. No action on selection. |
| Radio Buttons | <INPUT TYPE=RADIO> | Focus Check | On selection mark the button as checked and clear other buttons that are part of the button group. |
| Check-Box | <INPUT TYPE=CHECKBOX> | Focus Check | On selection mark the checkbox as checked. |
| Submit | <INPUT TYPE=SUBMIT> | Focus Border | On selection post the form query string for upload. Jump to the URL specified by the DESTINATION attribute in the <FORM> tag. |
| Reset | <INPUT TYPE=RESET> | Focus Border | On selection reset the form elements. |
| Image | <INPUT TYPE=IMAGE> | Focus | On selection Post the form query string for upload. Jump to the URL specified by the DESTINATION attribute in the <FORM> tag. |
| Hidden | <INPUT TYPE=HIDDEN> | None | Not selectable |

Figure 7:
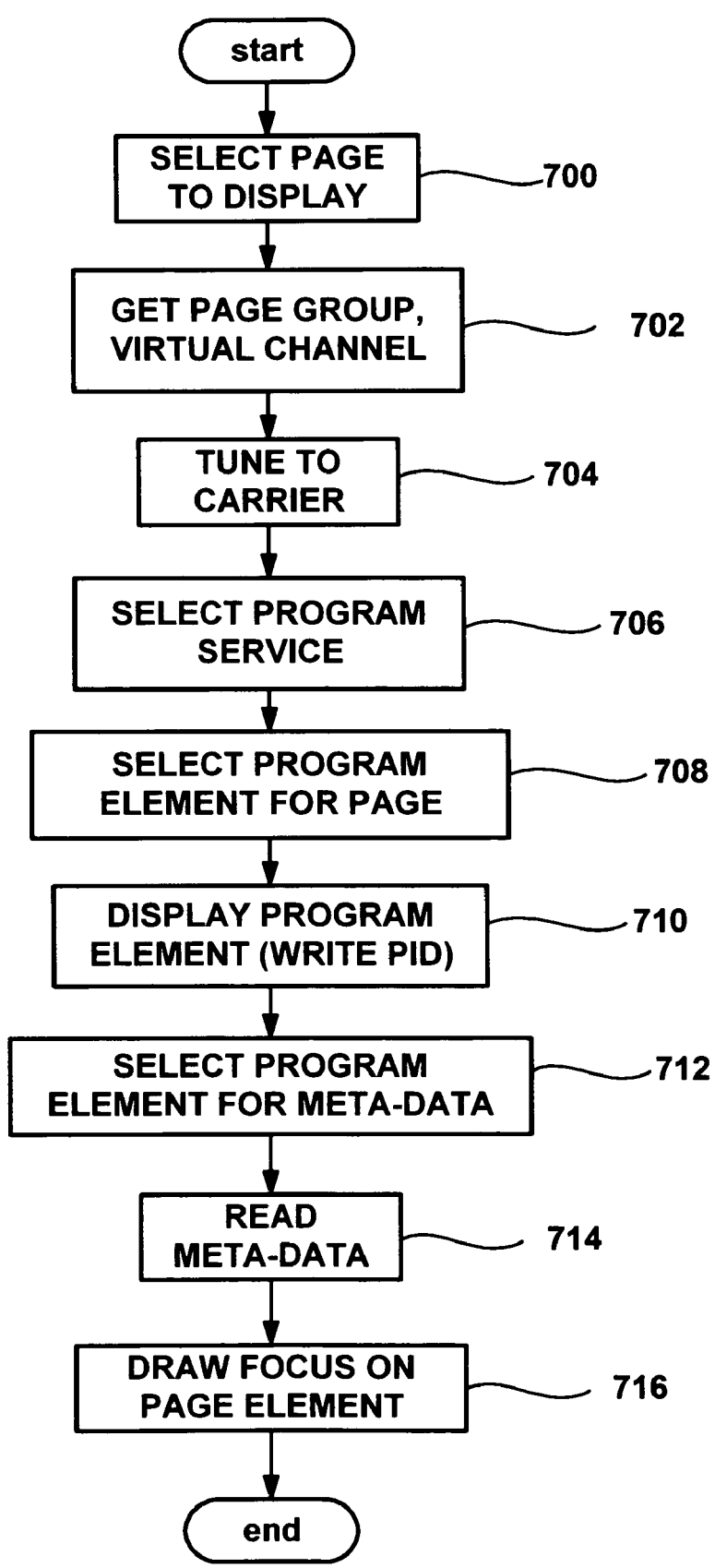
FIG. 7 is a flow diagram representing the general steps taken by a browser to display a page.

To select and display a carousel page, the browser 62 generally follows the steps set forth in the flow diagram of FIG. 7. First, as represented by step 700, the browser determines a page to display, i.e., a default page or a linked page. At step 702, the browser 62 references meta-data associated with that page to determine the page group to which that page belongs, and the digital channel corresponding thereto. As described in more detail below, a one-to-one mapping exists between a page group and a digital channel, and nine-to-one mapping exists between carousel pages and digital channels.

Cable boxes typically provide APIs 66 to control the tuner and selection of program elements in the MPEG2 stream. The browser 62 uses such an API (in the APIs 66) to specify the digital channel corresponding to the appropriate page group on the carousel 50, whereby the microprocessor 74 in the set-top box 28 tunes the in-band tuner 70 to the appropriate carrier (step 704) and selects the program (Service) corresponding to the desired page group (step 706). Note that the mapping between digital channels and carousel page programs is fixed. Next, at step 708, the browser 62 selects the program element (service component) containing the carousel page for display, and uses an API (or the like) to select the Video Program Element for display (step 710). As a result of this step, the PID is written to the PID filter 90 and the page image is decoded and displayed by the hardware.

At step 712, the Browser 62 selects the program element that carries the meta-data for the page group. Cable boxes may provide an API for this function, this time to acquire an identifier for the page meta-data. At step 714, the browser 62 reads the page meta-data, which, as described in more detail below, includes a record for each element on the page. Each element record includes information such as the geometry of focus for that element and other information specific to that element. For anchor elements, (described below), the record includes the digital channel and program element for the page to which the link refers. Note that the carousel 50 contents are completely described by the carousel meta-data, which is carried in-band. No out-of-band or backchannel data transmission is required to navigate between pages in the carousel 50.

After the meta-data has been read (step 714) by the browser 62, at step 716, the browser 62 draws focus on the default link as specified by the page meta-data. At this time, the page is ready for user-interaction. For example, as described above, the browser 62 draws focus on other links as they are tabbed to by the user, according to the focus chain specified in the page meta-data.

The browser 62 supports a subset of HTML anchors. The processing of each type of anchor is described below. The following table gives a brief summary of anchors supported by the Information Service.

| Element | Tag | Support | Attribute Support | Limits | Drawing Required | Notes |
|---|---|---|---|---|---|---|
| Text Anchor | <A HREF=url> anchor text </A> | Yes | | | Focus | Specifies text hyperlink. HREF indicates destination. |
| Image Anchor | <A HREF=url> <IMG SRC=url> </A> | Yes | | | Focus | Specifies image hyperlink. HREF indicates destination. |
| Client Image Map | <IMG SRC=url USEMAP=map> <MAP NAME=map> <AREA SHAPE=shape COORD=coord HREF=url> </MAP> | Yes | | | Focus | Specifies client-side imagemap. HREF indicates destination. |
| Server Image Map | <A HREF=CGIurl> <IMG SRC=url ISMAP> </A> | No | | | | Use client-side image map. |
| Automatic Hyperlink | <META HTTP-EQUIV= REFRESH CONTENT="delay; URL=url"> SLIDESHOW=YES | Yes | | | | Hyperlink specified by URL is automatically taken after delay (in seconds). |

The focus geometry for anchors and areas in imagemaps are specified in the page meta-data. The browser 62 uses this information to draw focus on hyperlinks and to select other pages for display when hyperlinks are selected. The page meta-data also specify the focus chain. At present, the browser 62 handles text anchors, image anchors, and areas within imagemaps identically. Thus, when the user moves focus to a hyperlink, the browser 62 simply draws focus, using the OSD 96, on some region of the screen as indicated by geometry information in the page meta-data. When the user selects the link, the browser 62 changes the display to the destination page as indicated by the link data in the former page's meta-data.

At present, it is not possible to specify explicitly that an anchor within a page should receive initial focus. Instead, the first anchor or imagemap in the HTML source will be the element that receives initial focus when a page is first displayed. Within an imagemap the order of the <AREA> tags will determine the order of focus within that imagemap. The order of the <IMG> tag within the HTML source will determine where the imagemap anchors will occur in the focus chain. Note that it is possible to edit the focus chain for a page at page conversion time, (described below), in order to achieve results that cannot be generated simply in an HTML source.

Automatic hyperlinks are allowed, in which after the page is displayed and the delay (specified in meta-data) has elapsed, the browser 62 displays the page to which the hyperlink refers. As before, the page meta-data of the former page includes information that the browser 62 uses to select the destination page for display. Nothing is rendered in response to an automatic hyperlink.

A server-side slideshow may also be indicated, in which a series of still images is sequentially displayed on the same page. Unlike a client-side autolink to another page, (which can produce a similarly-appearing client-side slideshow using multiple pages), the page change for a server-side slideshow takes place at the server side. Via the slideshow tag, the server 46 inserts a new page image in place of the old with each new cycle of the carousel 50. On the client side, the displayed slideshow page autolinks to itself to reacquire page meta-data. The slideshow feature enables the injection of a series of still images with appropriate meta-data, while only using a single page of the carousel 50. Moreover, the server 46 may obtain the series of images in advance, eliminating real-time downloading thereof. By way of example, a real estate entity may use this feature to present a series of images of new homes with accompanying meta-data, but only use one page of those available in the carousel 50. Note that a slideshow can present an image for any multiple of the carousel revolution time, e.g., eight seconds, by replicating images in a series as desired.

Moreover, this feature can be used in conjunction with client-side autolinks (using more than one page) to produce other update intervals. Indeed, by rebuilding the carousel, animation may be accomplished. To this end, a plurality of still images with slight changes from image to image will appear as animated movement. If a single-page slideshow, the animation may appear somewhat slow depending on the latency (e.g., a movement every eight seconds). However, with autolinks to multiple pages, the animation may be sped up. Note that MPEG2 is arranged to transmit change information between frames, and thus not much bandwidth is required to accomplish animation. Other image enhancements such as brightening a focus ring, adding images together and so on may be performed by rebuilding the carousel, taking advantage of MPEG2 features wherever possible.

In keeping with the invention, the browser 62 supports a subset of HTML forms with a few extensions. The processing of each of the form elements is described below. The following table gives a brief summary of forms supported by the Information Service. Only those attributes listed are supported at this time.

| Element | Tag | Support | Attribute Support | Limits | Drawing Required | Notes |
|---|---|---|---|---|---|---|
| Action | <FORM ACTION=url> | Yes | ACTION METHOD ENCTYPE DESTINATION=url | | | Form submission is standard syntax but is not sent via HTTP until the STB is polled. |
| One Line Text | <INPUT TYPE=TEXT> | Yes | NAME SIZE ALIGN DISABLED | Numeric Only MAXLENGTH == SIZE | Focus "0"–"9" | Intended for credit card number and quantity entry only. No editing of field. User must use Reset to clear field. |
| Multiple Line Text | <TEXTAREA> | No | | | | |
| Password | <INPUT TYPE=PASSWORD> | Yes | NAME SIZE ALIGN | Numeric Only MAXLENGTH == SIZE | Focus "*" | Intended for PIN entry only. No editing of field. User must use Reset to clear field. Characters are not echoed. |
| Drop Menus | <SELECT> | No | | | | Use radio buttons |
| Text Menus | <SELECT MULTIPLE> | No | | | | Use radio buttons |
| Graphic Menus | <SELECT MULTIPLE SRC=url> | No | | | | Use radio buttons |
| Radio Buttons | <INPUT TYPE=RADIO> | Yes | NAME VALUE CHECKED ALIGN | | Focus Check | |
| Check-Box | <INPUT TYPE=CHECKBOX> | Yes | NAME VALUE CHECKED ALIGN | | Focus Check | |
| Range | <INPUT TYPE=RANGE> | No | | | | Use type=TEXT |
| Submit | <INPUT TYPE=SUBMIT> | Yes | NAME VALUE ALIGN | | Focus Border | |
| Reset | <INPUT TYPE=RESET> | Yes | NAME ALIGN | | Focus Border | Allows simple edit control for text entry. User can only reset all fields. |
| Image | <INPUT TYPE=IMAGE> | Yes | NAME SRC ALIGN | | Focus | |
| Hidden | <INPUT TYPE=HIDDEN> | Yes | NAME VALUE AUTOSUBMIT | | None | Information Service specific VALUES will return textual user information (Name, Address, Phone) |
| Button | <INPUT TYPE=BUTTON> | No | | | | Use type=SUBMIT |
| Scribble | <INPUT TYPE=SCRIBBLE> | No | | | | |

Figure 8:
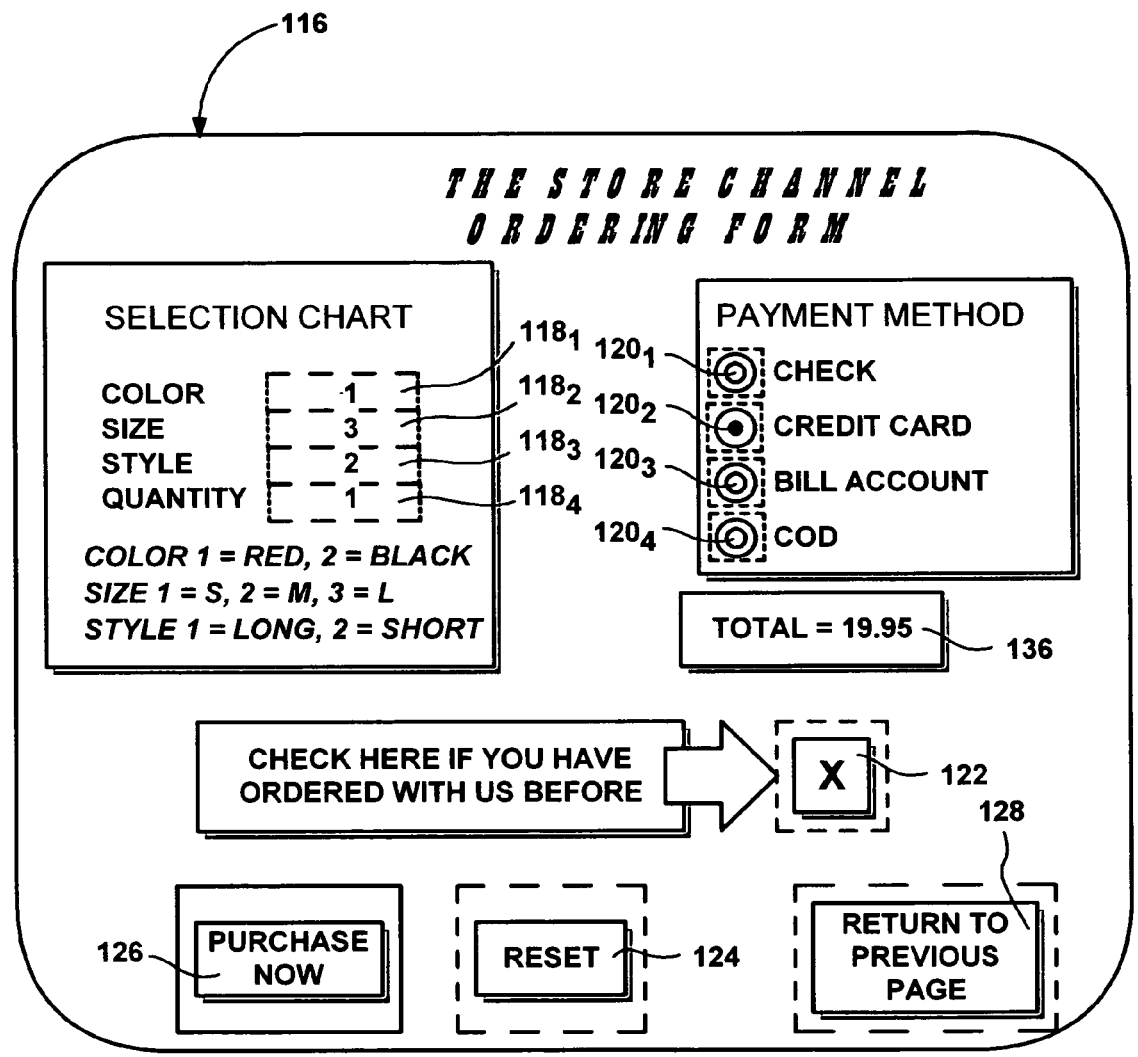
FIG. 8 is a representation of an exemplary page image having form elements thereon.

Using forms, a page can have simple data entry links, including check boxes, radio buttons, and numeric entry (text boxes). By way of example, FIG. 8 shows an exemplary page 116 including text boxes $118_1$-$118_4$, radio buttons $120_1$-$120_4$, and a check box 122. In addition, the page 116 includes a button 124 for submitting an order, a "RESET" button 126 for clearing entries, and a hyperlink element 128. In FIG. 7, focus is shown (by the solid rectangular ring) as being on the "PURCHASE NOW" submit button 124, while elements which can be focused are shown surrounded by dashed boxes (not ordinarily visible to an actual user).

One such form is a guide form, which is processed in real time by the programming guide to take an appropriate action upon user submission thereof. As described below, depending on the current time, the programming guide allows a user to link to a currently available program, add the program to a timer for timed viewing thereof, and/or prompt the user to purchase a pay-per-view event.

Another type of form is for purchasing merchandise or the like. To perform a purchase with this type of "store-and-forward" form, the user tabs through the various elements to select and enter appropriate information. The entered attributes (e.g. color, size, style, quantity, payment method and so on) are temporarily stored in the memory 82. Once the appropriate data is entered in this manner, the user selects the "PURCHASE NOW" link 124, which stores the selected information as data 130 (FIG. 3) (preferably in the non-volatile memory 86) in the set-top box 28. At a later time, the purchase information will be collected from the set-top box 28 with a polling procedure, whereby each box in the cable system 20 is directed in turn to call a polling server 132 via its modem 134 (FIG. 3), typically late at night.

More particularly, in a preferred embodiment of the present invention, there is no real-time interaction with a web server. As a consequence, form submission must be emulated. The meta-data for a page image includes all the necessary information required to generate a standard URL query string. When a form is submitted, data including the ACTION URL, the query string, and METHOD are stored as data 130 (preferably in NVRAM 86) in the set-top-box 28 as an ASCII string. These data are formatted exactly like a standard URL query string. The METHOD, GET or POST is appended to the form query string. In other words, a form element named _METHOD is appended to every form query string automatically. For instance, "&_METHOD=GET". An upload forms server 132 of the Information Service removes this sub-string when the form data are processed.

When the set-top-box 28 is polled via its modem 134 for the return data (typically once per day), the form data for all such forms which have been submitted are returned to the upload forms server 132 of the Information Service. The server 132 processes the form data and generates the appropriate HTTP GET or POST requests to the specified ACTION URL. Of course, user information, including name, billing and mailing addresses, and credit card type and number, will need to be collected from each user before a purchase can be made. This information can either be held remotely by the polling server 132, or stored within the set-top box 28 to be sent with each purchase. If this information is not available or valid, then the "PURCHASE NOW" button will link to an "error" page in the carousel, which will direct the user to call the service provider.

No immediate confirmation of the purchase will be available. The CGI scripts for Information Service forms cannot return HTML documents to subscriber-users since the contents of the carousel are broadcast and not unicast. However, the CGI forms script can send Email to the user in response to a forms query. To this end, the Email address of a particular set-top-box can be returned with the form data by using the Magic Element Name _EMAIL in a HIDDEN form elements (described below). Thus, an e-mail confirmation notice may be sent to the user, as described below with reference to the e-mail scenario.

The focus geometry for form elements is specified in the page meta-data, described below. As before, the browser 62 uses this information to draw focus on the form elements. At present, it is not possible to specify that a particular form element has the default focus for that form. Instead, the first form element in the HTML source will be the first element that receives focus when the user tabs to the form. It is also not presently possible to specify that a particular form element has the default focus for the page in which that element is contained. If, however, the form is the first element in the HTML source, then the first element in that form will receive the initial focus.

Note that for high-quality imaging, (relative to the low quality provided by the OSD 96), the face of a submit button (such as the "PURCHASE NOW" link 124) is rendered at page conversion time as part of the compressed page image. The button borders, however, are rendered at display time using the OSD 96 of the set-top-box 28. The page meta-data includes information that the browser 62 uses to draw button focus as well as drawing button borders.

As a result, when the user selects a submit button, the browser 62 directs the OSD 96 to draw the button borders such that the button appears to be depressed and released. As generally shown in FIGS. 5A-5B, when the user selects a submit button (step 512, FIG. 5A and step 530, FIG. 5B), the browser 62 then queues the appropriate form query string (step 532) for upload as described above, (or for processing by the program guide as described below). If a DESTINATION attribute is specified on the containing form, (as detected by step 534), then following the submit command the browser 62 will jump to the page corresponding to that destination (step 536).

Similarly, a reset button face (e.g., "RESET" button 126) is rendered at page conversion time as part of the compressed page image. The button borders are likewise rendered at display time using the OSD 96 of the set-top-box 28 so that the button appears to be depressed and released. The page meta-data includes information that the browser 62 uses to draw button focus as well as drawing button borders. When the user selects the reset button (step 538), the browser 62 appropriately draws the button borders and restores the form elements to their default state (step 540).

Any page that contains a text entry box or password box (described below) contains a reset button so that the user can clear errors. At present, the text entry and password boxes allow entry but do not support any other type of editing.

Any submit element, e.g., a "SUBMIT" button or a submit image element, is also rendered at page conversion time as part of the compressed page image. The page meta-data includes information that the Browser 62 uses to draw focus on the image. When the user selects the Submit Image, the Browser 62 queues the appropriate form query string for upload or processing by the guide. If a DESTINATION attribute is specified on the containing form then the Browser 62 will jump to that page.

Check boxes are also rendered at page conversion time as part of the compressed page image. Since a check mark may or may not appear based on the user entry, the check mark is rendered at display time using the OSD 96 of the set-top-box 28. The page meta-data includes information that the browser 62 uses to draw box focus as well as drawing the check marks on the box. When the user selects a check box (step 542), the browser 62 inverts the state of the box (step 544) in the memory 82 and correspondingly changes the display by either drawing or erasing a checkmark (shown as an "X" in box 122 of FIG. 8) on the selected checkbox. When the form is submitted, the boxes that are checked result in name/value pairs in the form query string.

Similarly, radio buttons are rendered at page conversion time as part of the compressed page image. The user-movable check (shown as a darkened circle in box $120_2$ of FIG. 8), however, is rendered at display time using the OSD 96 of the set-top-box 28. The page meta-data includes information that the browser 62 uses to draw button focus as well as drawing check marks on the button. When the user selects a radio button (step 546), the browser 62 sets the state of that button to selected while de-selecting others with the same name. At step 548, the browser 62 also causes the OSD to draw a suitable checkmark on the button, and erase the checkmarks on any other buttons with the same name. When the form is submitted, the button that is checked results in a name/value pair in the form query string.

At present, a Text Entry Box only supports entry and echo of the numerals "0" through "9," and only a single font and pitch are supported. A Text Entry Box is rendered at page conversion time as part of the compressed page image. Echoed text is rendered at display time using the OSD 96 of the set-top-box 28. The page meta-data includes information that the browser 62 uses to draw focus as well as information for drawing the characters.

When a text box is selected at step 512 (FIG. 5A) and 550 (FIG. 5B), the browser 62 draws focus on the text box. If the user depresses a number key on the keypad then at step 552 that number is displayed in the leftmost position of the text box and advances the text entry position to the next character position. No cursor is presently displayed to indicate the text entry position, and the next character is simply the rightmost unoccupied character position in the text box. When the user depresses another number key on the keypad, that number is displayed in the new character position and the text entry position is advanced. When the form is submitted a name/value pair is appended to the form query string.

Certain rules for text boxes presently apply. If the user attempts to enter more than characters then allowed in the SIZE field of the meta-data (described below), those characters are ignored. Moreover, for now a text box does not support any type of editing, and thus in order to clear errors, the user uses a reset button on the form. No default values (using the VALUE attribute) may be specified for text boxes. The Password Box is identical in function to the text box except that the characters are not echoed. Instead, an asterisk ("*") or the like is displayed at step 552 for every character that is entered.

The browser 62 also supports the DISABLED attribute, (seldom supported by legal HTML), which, when used in conjunction with the magic name "_TOTAL" can be used to generate a read-only text box which displays the total cost of a purchase transaction. For instance the tag <INPUT TYPE=TEXT NAME=_TOTAL SIZE=5> will generate a text box 5 characters in size in which the following result is displayed: _TOTAL=_QUANTITY*_PRICE+_SANDH, where _QUANTITY is presumably to be entered by the user in a text box (e.g., the text box $118_4$) and _PRICE and _SANDH are specified using hidden text. Such a read only text box 136 is shown in FIG. 8.

Hidden text results only in page meta-data. Nothing is rendered either at page conversion time or at display time. When a form is submitted Hidden Text results in a name/value pair being appended to the form query string.

Certain state information stored within the set-top-box may be returned as part of the form query string by using "magic element names" for the NAME of the hidden text. In such an event, no VALUE need be specified.

The Information Service of the present invention adds two attributes to the standard HTML syntax. More particularly, a first way in which the Information Service extends the standard HTML hidden text syntax is by adding the attribute AUTOSUBMIT to the tag <INPUT TYPE=HIDDEN>. When the user leaves a page with a form containing a hidden text element with the AUTOSUBMIT attribute, the form query string is queued for upload just as if the user had selected a submit button.

Second, the attribute DESTINATION has been added to the tag <FORM>. This tag causes the Browser 62 to jump to the specified page when the user submits the form. This allows the author to specify an HTML page that simulates the result of the HTTP GET on normal form submission (e.g., through CGI). This tag is unique to the Information Service system.

For any page, it is possible to include a link that tunes the set-top box 28 to a video channel rather than a link to another page. To this end, the Information Service facilitates interaction with a programming guide (e.g., PreVue). The exact behavior of the link depends on the type of video program that is selected. If the link selects a channel with no time (of day) associated therewith, or selects a channel with a time that indicates a currently available program, the set-top box immediately tunes to the selected channel. If the associated time is in the future, the user is presented with a programming guide pop-up window and prompted to add the program to a timer for timed viewing thereof. If the program is a pay-per-view event, the user is prompted to buy the event, and, if purchased, the browser 62 either tunes to the channel or adds the program to the timer.

To accomplish such actions, the Information Service provides access to functions in the programming guide through the use of forms. A form that accesses the guide does so by specifying an ACTION URL that is processed by the guide, that is, the guide looks like a web-server running a CGI script. One such guide is accessed using the URL "http://www.prevue.com/cgi/guide".

At page conversion time, this URL is recognized, and meta-data for the page indicate that the form query string should be submitted to the guide for processing. At page display time, when the form is submitted, the browser 62 submits the form query string to the guide rather than queue it for upload. To reduce meta-data size and simplify argument processing, the query string is preferably collapsed into a compact binary representation thereof at page conversion time. This syntax allows page image authors to access guide emulation (e.g., provided by PreVue) at author time. The following table sets forth the queries that are supported by the guide:

| Function | Query Syntax | Description |
| --- | --- | --- |
| TUNE | Function=TUNE &SourceID=program_name &Time=now | Switch to a television program |
| REMIND | Function=TUNE &SourceID=program_name &Time=some_future_time | Set a reminder for a television program |
| RECORD | Function=REC &SourceID=program_name &Time=some_future_time | Set a reminder for a television program |
| EMAIL HELO | Function=HELO | Opens EMAIL session |
| EMAIL QUIT | Function=QUIT | Closes EMAIL session |
| EMAIL DATE | Function=DATE &UpperLeft=xlocation+ylocation &LowerRight=xlocation+ylocation | Display current message RFC822 "Date" text at the specified screen location. |
| EMAIL FROM | Function=FROM &UpperLeft=xlocation+ylocation &LowerRight=xlocation+ylocation | Display current message RFC822 "From" text at the specified screen location. |
| EMAIL SUBJ | Function=SUBJ &UpperLeft=xlocation+ylocation &LowerRight=xlocation+ylocation | Display current message RFC822 "Subject" text at the specified screen location. |
| EMAIL BODY | Function=BODY &UpperLeft=xlocation+ylocation &LowerRight=xlocation+ylocation | Display current message RFC822 message body text at the specified screen location. |

| Function | Query Syntax | Description |
| --- | --- | --- |
| EMAIL ACKS | Function=ACKS | Save the current message and increment the current message indicator. |
| EMAIL ACKD | Function=ACKD | Delete the current message and increment the current message indicator. |
| EMAIL ACKB | Function=ACKB | Save the current message and decrement the current message indicator. |

IV. Page Images

As described above, the carousel of page images and meta-data are carried as a single MPEG2 Transport Stream, and each page image is a single MPEG2 video sequence consisting of a single I-Frame image of the rendered HTML page. As generally represented in the program map tables $138_1$-$138_n$ of FIG. 9, each page image is carried as a single program element (i.e., Service Component) of a program (i.e., Service), and, (as limited by the DCT1000 set-top box), each program (Service) ordinarily consists of ten program elements. As further seen in the program map tables $138_1$-$138_n$ of FIG. 9, nine of the program elements (i.e., a page group) contain page images, and the other program element contains the meta-data for the nine page images that make up the program. The meta-data are carried as the first program element within a program.

Figure 9:
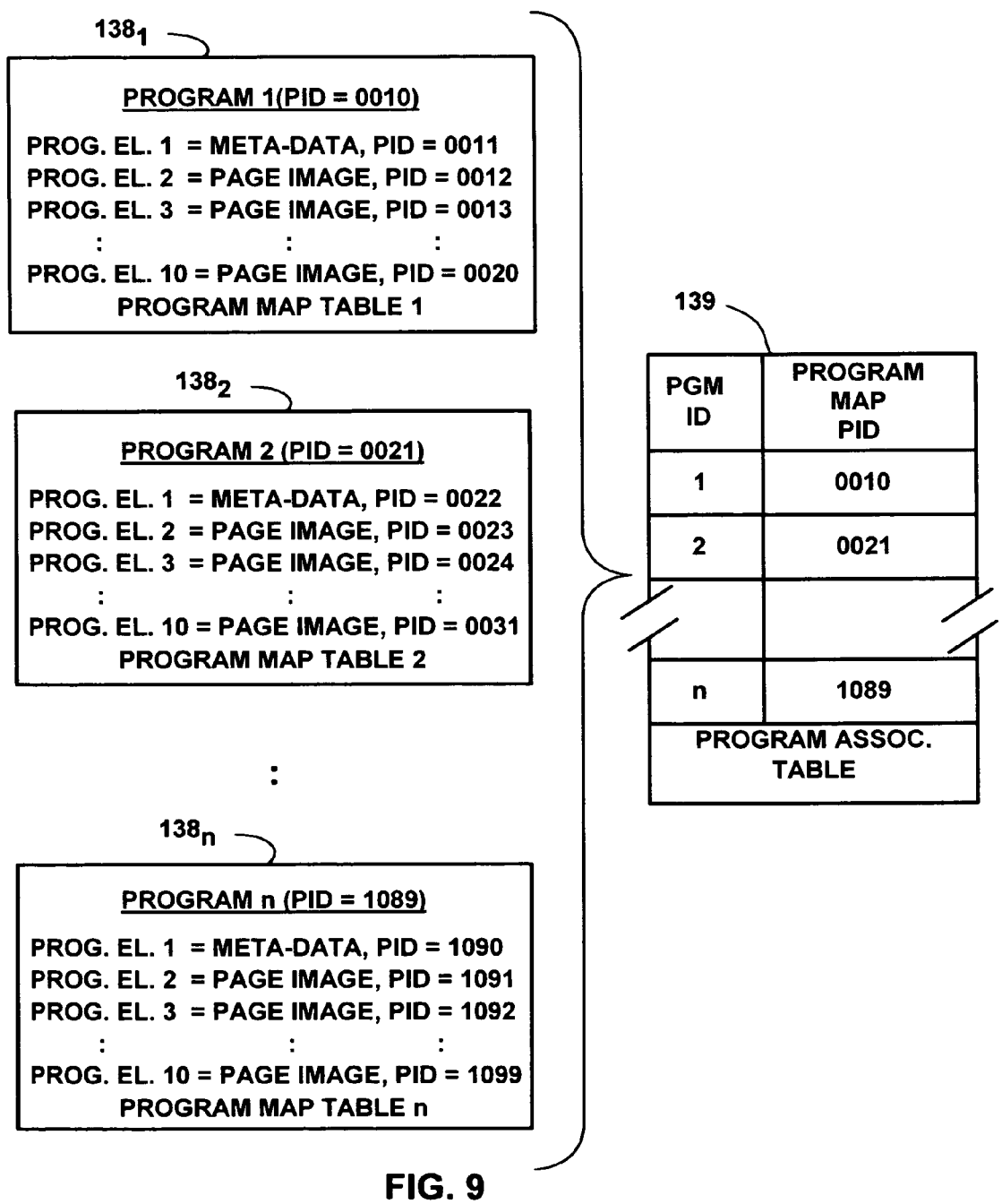
FIG. 9 is a representation of the logical organization of program elements, including page images, within programs.

As also represented in FIG. 9, each group of nine image pages in the carousel 50, which correspond to a distinct program, is mapped to a single digital channel. Thus, (as described above with reference to FIG. 7), in order to display a particular page, the browser 62 tunes to the appropriate digital channel and selects the appropriate program element (Service Component) for display. The browser 62 also selects the first (meta-data) program element so that it can render focus and execute links as directed by the user. The transport stream includes the appropriate PSI data to allow the page images to be selected and displayed.

According to digital transmission conventions, the program map table $138_1$-$138_n$ (i.e., Service Definition Table) maintained for each program contains 10 entries, and, including the PID which caries the program map table, thus uses 11 PIDs. A program association table 139 (Service Association Table) associates programs with program map PIDs and thus contains as many entries as the number of carousel pages divided by nine. The maximum number of page images that may be carried by a single carousel 50 is limited to 6700 pages. Note that if PCRs must be supplied to ensure that the set-top-box NTSC sub-carrier does not drift, then a single valid PCR stream will be multiplexed with the carousel data. The program map table for all programs references this PID as the PCR_PID.

Pages are delivered to the server in a two-stage process. First, a content provider transfers information (from an external source such as the Internet 48) to the Information Service server 46, the information including provider identification, a root URL of the content, and the date and time the content is to become valid. Any acceptable protocol for this transmission is feasible, including Hypertext Transfer Protocol (HTTP) or a private message protocol on top of TCP/IP.

Second, using HTTP, the Information Service server gathers the content at the specified URL and stores it for processing into the carousel 50. The timing of this transfer may vary depending on several factors, including available storage at the server, number of pending transfers, date and time the content is to become valid and default actions specified by the cable operator. In any event, the content is transferred before the start time. For real-time updates (e.g. sports, scores or stock information), the same process is followed, but with an immediate start time. The system is designed to allow for low latency for both the information transferring and content gathering stages.

Figure 10:
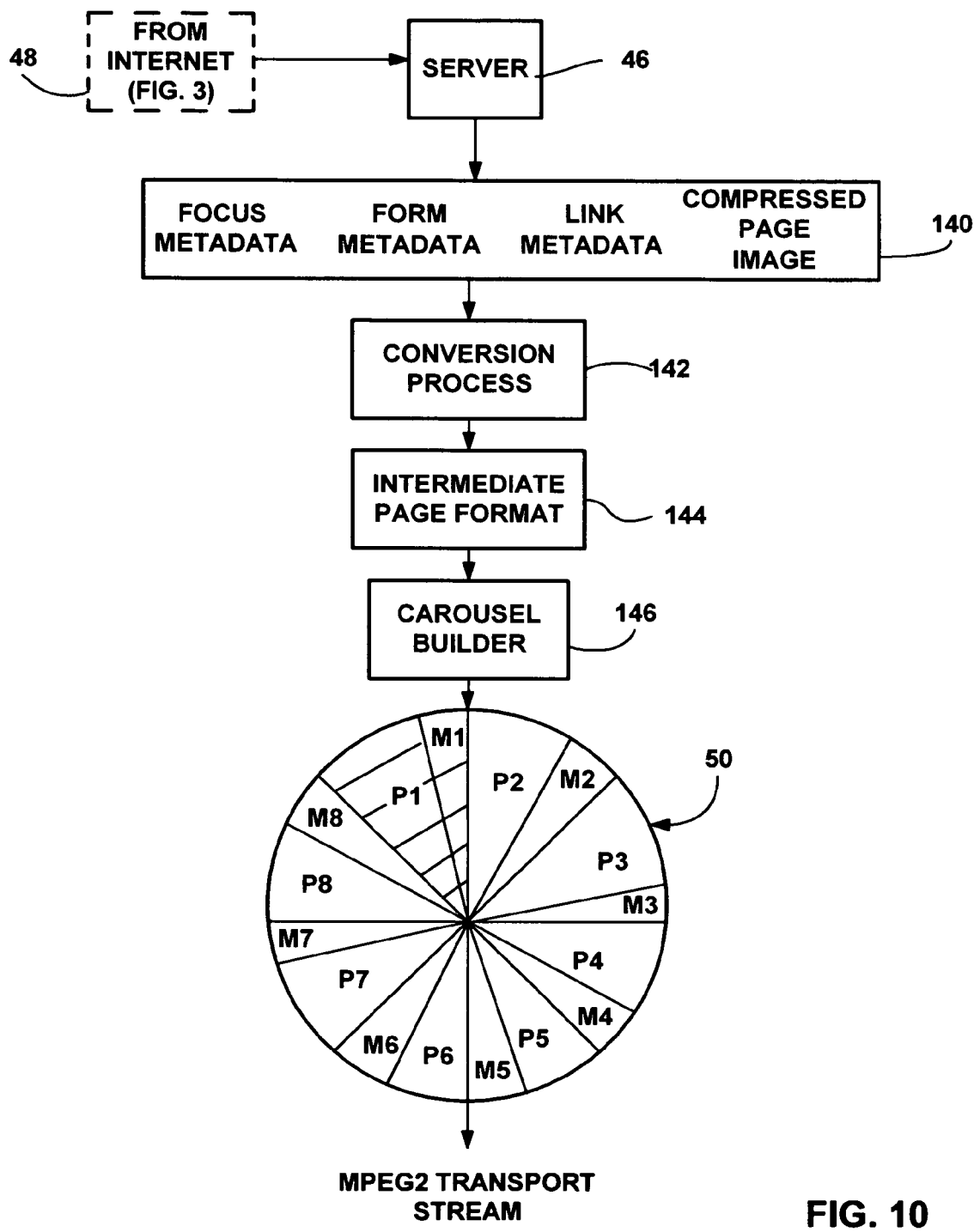
FIG. 10 is a block diagram representing server components for injecting page information into the cable transmission.

As generally represented in the block diagram of FIG. 10, a conversion process 142 converts the page 140 into an intermediate page format 144, where it is passed to a carousel builder 146. One purpose of the intermediate page format is to reduce the amount of processing that needs to be performed by the processor 74 at the cable end. For example, rather than have the cable end processor dynamically calculate from an HTML page layout where to jump in response to a cursor key, the jump is pre-decided and stored in the intermediate page format.

The IPF file includes an image tag, a program information tag and a meta-data tag as described below. Note that the values correspond with fields within the meta-data as described herein.

Image Tag

<META NAME=PARAKEET_IMAGE CONTENT="Url"> where Url represents the URL of the MPEG video file, (e.g., www.content.com/Page1.M2V).

Program Information Tag

<META NAME=PARAKEET_PROGRAM_INFO CONTENT="PROGRAM=Program ELEMENT=Element PACKAGE=Package "> where PROGRAM=Program specifies the program_number or SourceID of the page. This is only relevant for quick pages, i.e., a page that is mapped as a channel, (for example, channel 100 might be the weather page). ELEMENT=Element specifies the program_element or ServiceComponentID of the page (only relevant for quick pages), and PACKAGE=Package specifies the package number for premium or tiered services.

Meta-Data Tag

```
<META NAME=PARAKEET_METADATA CONTENT="
_PAGE_META_DATA TYPE=Type AUDIO=Url DELAY=Time
_ELEMENT_DESCRIPTOR TYPE=Type
_LINK_DESCRIPTOR Url
_FOCUS_DESCRIPTOR SHAPE=Shape COUNT=CoordCount UP=UE
DOWN=DE RIGHT=RE LEFT=LE COORDS=X,Y,X,Y, . . .
_FORM_DESCRIPTOR NAME=Name VALUE=Value
COORDS=X1,Y1,X2,Y2
_FORM_DESCRIPTOR FUNCTION=Function TIME=Time
COORDS=X1,Y1,X2,Y2
">
```

The PAGE_META_DATA contains the per-page meta-data, wherein TYPE=Type indicates the type of the page (e.g.

Hold, Reload, Autolink, and so on), AUDIO=Url identifies the URL of the background audio file (e.g., www.sounds.parakeet.com/classical.ac3), and DELAY=Time specifies the delay in seconds for Autolink pages. For each element on the page one or more of the following tags will be found, and will be grouped together such that the tags for a particular element occur together, (_ELEMENT_DESCRIPTOR, _LINK_DESCRIPTOR, _FOCUS_DESCRIPTOR, _FORM_

FUNCTION=Function—the GUIDEFORM function (e.g. TUNE),

TIME=Time—the effective time for TUNE or REC function, and

COORDS=X1,Y1,X2,Y2—the coordinates for text field on GUIDEFORMs.

The following shows an example of an IPF file for a simple page only containing links:

```
<META NAME=PARAKEET_ORIGINAL_HTML CONTENT="
<!--META HTTP-EQUIV="Refresh" CONTENT = "5; URL = page17.htm"--
>
<HTML><BODY SCROLL=NO BGCOLOR=BLACK leftmargin=0 topmargin=0>
<IMG SRC=Weather1.jpg BORDER=0 USEMAP="#coords">
<MAP NAME="coords">
<AREA SHAPE=RECT COORDS="427,36,583,68" HREF="page17.htm">
<AREA SHAPE=RECT COORDS="502,385,584,445" HREF="page0.htm">
<AREA SHAPE=RECT COORDS="425,108,585,142" HREF="page5.htm">
<AREA SHAPE=default HREF="page0.htm">
</MAP>
</BODY></HTML>
">
<META NAME=PARAKEET_IMAGE CONTENT="Page1.M2V">
<META NAME=PARAKEET_PROGRAM_INFO CONTENT="PROGRAM=16129
ELEMENT=0 PACKAGE=0">
<META NAME=PARAKEET_METADATA CONTENT="
_PAGE_META_DATA TYPE=HOLD AUDIO=NONE DELAY=0
_ELEMENT_DESCRIPTOR TYPE=LINK
_LINK_DESCRIPTOR page17.ipf
_FOCUS_DESCRIPTOR SHAPE=RECT COUNT=2 UP=2 DOWN=1 RIGHT=1 LEFT=2
COORDS=237,36,323,68
_ELEMENT_DESCRIPTOR TYPE=LINK
_LINK_DESCRIPTOR page0.ipf
_FOCUS_DESCRIPTOR SHAPE=RECT COUNT=2 UP=0 DOWN=2 RIGHT=2 LEFT=0
COORDS=279,385,323,445
_ELEMENT_DESCRIPTOR TYPE=LINK
_LINK_DESCRIPTOR page5.ipf
_FOCUS_DESCRIPTOR SHAPE=RECT COUNT=2 UP=1 DOWN=0 RIGHT=0 LEFT=1
COORDS=236,108,324,142
">
```

Figure 11:
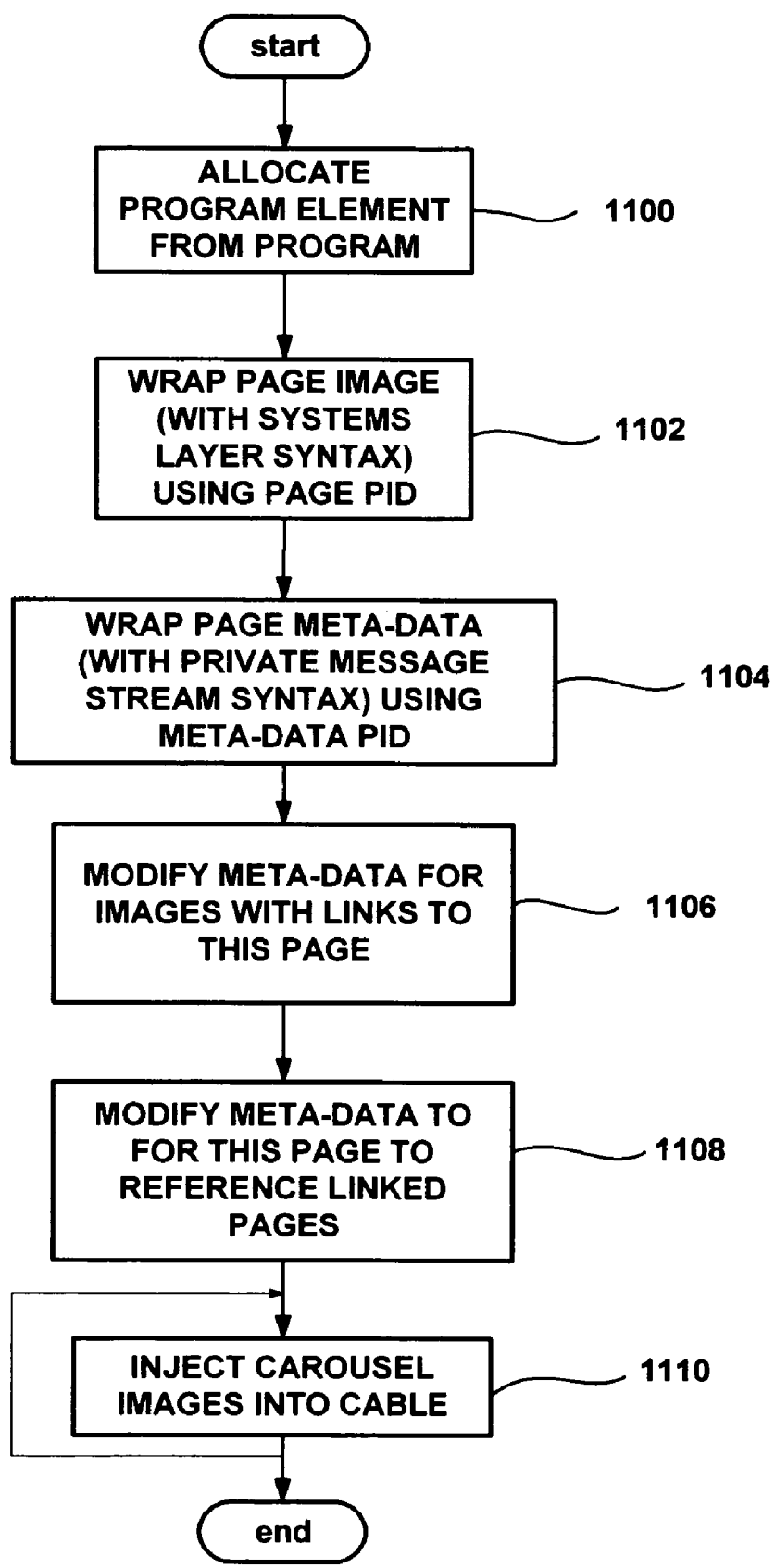
FIG. 11 is a flow diagram representing the general steps taken to construct a carousel of pages.

DESCRIPTOR). Note that there are two formats for the _FORM_DESCRIPTOR. The following describes the information in the tag:

TYPE=Type—the element type (e.g. LINK, FORM, INPUT_SUBMIT, and so on),

Url—for elements that link the URL of the destination page (e.g. www.contentprovider.com/pageN.ipf), SHAPE=Shape—shape of the focus, (e.g., CIRCLE, RECT, POLYGON), COUNT=CoordCount—the number of coordinates for focus, UP=UE—the element to receive focus on up-button press, DOWN=DE—the element to receive focus on down-button press, RIGHT=RE—th element to receive focus on right-button press, LEFT=LE—the element to receive focus on left-button press, COORDS=X,Y,X,Y, . . .—the Coordinates for focus, NAME=Name—the NAME attribute of form element VALUE=Value—the VALUE attribute of form element COORDS=X1,Y1,X2,Y2—the coordinates of form element (e.g., the button corners), To build the carousel 50, the carousel builder 146 generally follows the steps of FIG. 11, whereby at step 1100 a program element (Service Component) is allocated from the program (Service) which will carry the page and its meta-data. Note that there is a one-to-one mapping between program elements and pages and a nine-to-one mapping between pages and programs. At step 1102, the page image is then wrapped with the appropriate Transport Stream systems-layer syntax using the appropriate PID from the program map table (Service Definition Table). Then, at step 1104, the page meta-data are wrapped in the appropriate private_message_stream syntax and Transport Stream syntax, using the appropriate meta-data PID from the Program Map Table.

At step 1106, the meta-data (described below) for any pages that contain links to the (newly provided) page are modified to contain the program number and program element for this page. Similarly, at step 1108, the meta-data for the newly-provided page is modified to contain the program number (SourceID) and program element (Service Component) for pages that are linked to by the page. The initial state of the link program number in the page meta-data is such that a Null page is indexed. The Null page resides on program number 1, and contains an image indicating that the page is not available. Lastly, as represented by step 1110, when the carousel 50 is ready for transmission, the information server 46 periodically takes each carousel image stored in the 50 and injects the image onto the transmission medium 24, a process which continues for the carousel 50 until page information therein is changed. As a result, pages are periodically available at the subscriber end as described above.

The carousel builder 146 maintains a carousel description that is modified by page update messages. Each time the carousel 50 changes, the carousel builder 146 creates a new carousel image (in server memory) from the carousel description and the pages (stored on disk). When the new carousel image is completed, it replaces the old carousel at the beginning of the next cycle. Note that in the case of pages that change each cycle, i.e., "slide show" pages, a new carousel must be built for each cycle.

V. Meta-Data

In order for the user to interact with the pages, the page images have meta-data and PSI data associated therewith in the Transport Stream. In general, the carousel page meta-data contain the information necessary for the browser 62 to render focus on the links on the page corresponding thereto. The meta-data also contain information for selecting a new page image when the user selects a link, gather form input from a subset of Hypertext Markup Language (HTML) form elements and/or post form input for deferred processing.

The meta-data for a page group (of nine pages) are carried in a single program element consisting of private_stream_ messages. To associate the appropriate meta-data with its corresponding page, the meta-data is fragmented into multiple private_stream_messages such that the meta-data for a particular page is carried as a unique session. Each private_stream_message is capable of containing a predetermined number of bytes of meta-data. The meta-data for a page consists of four tables, identified herein as the page element table, the link table, the focus table, and the form table. These tables are described in more detail in the following sections.

The following table provides a high-level description of the information that is carried in the meta-data for various HTML constructs:

| HTML Tag | Meta-data content | Description |
| --- | --- | --- |
| <A HREF=url> | Focus Specifier<br>Page Address | Describes how to draw focus on the link and the program_number and Program Element that carry the destination page |
| <AREA SHAPE=shape COORDS=coords HREF=url> | Focus Specifier<br>Page Address | Describes how to draw focus on the link in a client-side image-map and the program_number and Program Element that carry the destination page |
| <FORM ACTION=url DESTINATION=url> | Transaction URL<br>Page Address | Indicates where the form result should be posted. When the form is submitted, the DESTINATION page is displayed. |
| <INPUT TYPE=SUBMIT> | Focus Specifier<br>Location Specifier | Describes how to draw focus and borders on the SUBMIT button and indicates that form should be posted when the button is selected. |
| <INPUT TYPE=IMAGE SRC= url> | Focus Specifier | Describes how to draw focus on the image and indicates that the form should be posted when the image is selected. |
| <INPUT TYPE=HIDDEN AUTOSUBMIT> | | Indicates that the form should be submitted automatically when the user leaves the page. |
| <INPUT TYPE=HIDDEN NAME=name VALUE=value> | Form Element Name<br>Form Element Value | Indicates that the name/value pair should be submitted with the form. Nothing is displayed. |
| <INPUT TYPE=HIDDEN NAME=magic_name> | Form Element Name | Same as above but the value is retrieved from the local user database based on the name. |
| <INPUT TYPE=CHECKBOX NAME=name VALUE=value> | Focus Specifier<br>Location Specifier<br>Form Element Name<br>Form Element Value | Describes how to draw focus and draw check on checkbox. Indicates name/value pair to be returned if the box is checked. |
| <INPUT TYPE=RADIO NAME=name VALUE=value> | Focus Specifier<br>Location Specifier<br>Form Element Name<br>Form Element Value | Describes how to draw focus and draw check on radio button. Indicates name/value pair to be returned if the box is checked. |
| <INPUT TYPE=TEXT NAME=name VALUE=value > | Focus Specifier<br>Text Specifier<br>Form Element Name<br>Form Element Value | Describes how to draw focus and draw text on the text entry element and the initial value. Only numerals are supported. No edit control, user must use RESET to clear the field. |
| <INPUT TYPE=PASSWORD NAME=name> | Focus Specifier<br>Text Specifier<br>Form Element Name | Describes how to draw focus and draw text on the password entry element. Only numerals are supported. They are echoed as "*". No edit control, user must use RESET to clear the field. |
| <INPUT TYPE=TEXT NAME=_TOTAL> | Location Specifier<br>Form Element Name | No focus is rendered on this element. It is output only and numeric only. The value is the product of the magic names _QUANTITY and _PRICE added to _SANDH. |
| <INPUT TYPE=RESET> | Focus Specifier | Describes how to draw focus on the RESET button and indicates that form elements should be reset when the button is selected. |
| <META HTTP-EQUIV= REFRESH CONTENT="delay; URL=url"> | Page Address<br>Delay | Causes the browser to jump to the specified URL after the specified delay automatically. |

The page Meta-data contains all of the meta-data for a page, as described in the following table:

| Syntax | No. of bits | Mnemonic |
|---|---|---|
| PAGE_META_DATA(){ | | |
|    ID | 16 | Uimsbf |
|    Type | 8 | Uimsbf |
|    Reserved | 8 | Uimsbf |
|    Delay | 16 | Uimsbf |
|    Reserved | 16 | Uimsbf |
|    LinkOffset | 16 | Uimsbf |
|    FocusOffset | 16 | Uimsbf |
|    FormOffset | 16 | Uimsbf |
|    for (i=0;i<LinkOffset;i++){ | | |
|       LINK_DESCRIPTOR( ) | | |
|    } | | |
|    for (I=0;i<FocusOffset;i++){ | | |
|       FOCUS_DESCRIPTOR( ) | | |
|    } | | |
|    for (i=0;i<FormOffset;I++){ | | |
|       FORM_DESCRIPTOR( ) | | |
|    } | | |
| } | | |

The ID field is used to uniquely identify the page, and is thus used to verify hyperlinks. The Type field contains the page type, as set forth in the following table:

| Type | Type code | Delay | Description |
|---|---|---|---|
| Reload | 0xFF | | Page should be displayed and updated continuously. |
| Hold | 0x00 | x | Page should be displayed and not updated continuously until the specified delay has passed. |
| AutoLink | 0x01 | x | Page should be displayed and then the link specified by the AUTOLINK element should be executed after the specified delay. |

Referring back to the meta-data table, following the Type field and a reserved field, a Delay field is provided which contains a delay measured in seconds (for use with the types Hold and Autolink). A LinkOffset field indicates the offset of the base of the link table from the start of the meta-data. Similarly, a FocusOffset field indicates the offset of the base of the focus table from the start of the meta-data, and a FormOffset field indicates the offset of the base of the form table from the start of the meta-data.

A page element table is also provided in the meta-data, and comprises a table composed of one or more ELEMENT_DESCRIPTORs. There is an ELEMENT_DESCRIPTOR for every element (e.g., link) on the page. Each element requires additional information based on what type of element it is, and corresponds to some HTML syntax in the source. Some simple rules have been established regarding the structure of the page element table, including the rule that if an "AUTOLINK" element exists, then it is to be the first element in the element array. Also, "FORM" elements are to be located in the first entries of the page element table, after any AUTOLINK element. Form elements are to immediately follow the FORM element for the enclosing form. Lastly, the first element that can receive focus (as specified in the page element table) will receive the initial focus when the page is displayed.

The following table describes the content of an ELEMENT_DESCRIPTOR.

| Syntax | No. of bits | Mnemonic |
|---|---|---|
| ELEMENT_DESCRIPTOR(){ | | |
|    Type | 8 | Uimsbf |
|    Reserved | 8 | Uimsbf |
|    LinkOffset | 16 | Uimsbf |
|    FocusOffset | 16 | Uimsbf |
|    FormOffset | 16 | Uimsbf |
| } | | |

The "Type" field indicates the type of element, having one of the values set forth in the table below. The "Type" field is followed by a reserved field. A LinkOffset field indicates the offset in bytes, within the link table, of the LINK_DESCRIPTOR for this element. Similarly, a FocusOffset field indicates the offset in bytes, within the focus table, of the FOCUS_DESCRIPTOR for this element. Likewise, the FormOffset field indicates the offset in bytes, within the form table, of the FORM_DESCRIPTOR for this element. As can be appreciated, the size of an ELEMENT_DESCRIPTOR is fixed regardless of the type of the element.

The following table shows the identifying type code and the additional information that is required for each type of element, denoted by an "X":

| Element Type | Type code | Focus Specifier | Link Specifier | Form Specifier |
|---|---|---|---|---|
| FORM | 0x00 | | X | X |
| AUTOFORM | 0x04 | | X | X |
| GUIDEFORM | 0x08 | | X | X |
| INPUT_IMAGE | 0x0C | X | | X |
| INPUT_HIDDEN | 0x10 | | | X |
| INPUT_SUBMIT | 0x14 | X | | X |
| INPUT_RESET | 0x18 | X | | X |
| INPUT_CHECK | 0x1C | X | | X |
| INPUT_RADIO | 0x20 | X | | X |
| INPUT_TEXT | 0x24 | X | | X |
| INPUT_PASSWORD | 0x28 | X | | X |
| AUTOLINK | 0x2C | | X | |
| LINK | 0x30 | X | X | |

To accomplish hyperlinking, the link table contains a LINK_DESCRIPTOR for each page element that is capable of having a hyperlink, as set forth in the following table:

| Syntax | No. of bits | Mnemonic |
|---|---|---|
| LINK_DESCRIPTOR(){ | | |
|    ID | 16 | Uimsbf |
|    ProgramNumber | 16 | Uimsbf |
|    ProgramElement | 8 | Uimsbf |
|    PackageNumber | 8 | Uimsbf |
| } | | |

The ID field of the link table uniquely identifies the destination page to which an element is linked, and is used to verify hyperlinks. The ProgramNumber field contains the program_number of the program that carries the destination page, and the ProgramElement contains the program element within the program that carries that destination page. An eight-bit reserved field is also present thereafter in the link table. The PackageNumber field represents the level of tiering access, which via an authorization operation, controls the level of service to which the subscriber is entitled. Note that the size of an LINK_DESCRIPTOR is fixed.

For handling the focus operation, the focus table contains a FOCUS_DESCRIPTOR (list) for each page element that can receive focus. The FOCUS_DESCRIPTOR indicates how to draw focus on the page element. Focus may be indicated with a rectangle, a circle or a polygon as the focus ring. The FOCUS_DESCRIPTOR also indicates to which page element the focus should be shifted for each of the direction keys, (i.e., the focus chain). Note that some elements such as hidden text do not receive focus and are not part of the focus descriptor list. The following table describes the content of a FOCUS_DESCRIPTOR:

| Syntax | No. of bits | Mnemonic |
|---|---|---|
| FOCUS_DESCRIPTOR( ){ | | |
|   ElementUp | 16 | Uimsbf |
|   ElementDown | 16 | Uimsbf |
|   ElementRight | 16 | Uimsbf |
|   ElementLeft | 16 | Uimsbf |
|   Shape | 8 | Uimsbf |
|   CoordCount | 8 | Uimsbf |
|   For (i=0;i<CoordCount;i++){ | | |
|     COORD_DESCRIPTOR( ) | | |
|   } | | |
| } | | |

The ElementUp field contains the index within the element table of the element that should next receive focus when the user selects the UP button. For example, in FIG. 6, if focus is on the "SPORTS REPORT" link $110_2$, a logical change in focus for the "UP" button would be to the "TO NEXT PAGE" link $110_1$. Thus, the ElementUp field of the focus table for the "SPORTS REPORT" element would contain the index within the element table of the "TO NEXT PAGE" element. However, the ElementUp field of the "TO NEXT PAGE" element may be "TO NEXT PAGE," since no element is above it, or may instead toggle focus back to any of the other elements, depending on the page author's preference as influenced by agreed-upon conventions.

Similarly, the ElementDown field contains the index within the element table of the element that should receive focus next when the user selects the Down button, the ElementRight field contains the index within the element table of the element that should next receive focus when the user selects the Right button, and the ElementLeft field contains the index within the Element Table of the element that should receive focus when the user selects the Left button.

The Shape field indicates the shape of the focus ring (drawn by the OSD 96) that will indicate focus on the given element. A 0xFF in this field indicates a polygon, a 0x00 indicates a rectangle, and a 0x01 indicates a circle. The CoordCount field contains the number of coordinates that are needed to define the focus shape, i.e., Rectangle =2, Circle =2 and Polygon=N. The following table summarizes the number and type of coordinates supplied for each type of shape:

| Shape Name | Shape Code | CoordCount | Description |
|---|---|---|---|
| Polygon | 0xFF | N | There are as many coordinates as there are vertices of the polygon. The COORD_DESCRIPTORS are to occur in the order that they would be encountered during a continuous tracing of the polygon edges. |
| Rectangle | 0x00 | 2 | The first coordinate is the upper left corner of the rectangle. The second coordinate is the lower right corner of the rectangle. |
| Circle | 0x01 | 2 | The first coordinate is the center of the circle. The second coordinate is the point on the radius of the circle with the minimum X value. |

The format of the COORD_DESCRIPTOR is described in the following table:

| Syntax | No. of bits | Mnemonic |
|---|---|---|
| COORD_DESCRIPTOR( ){ | | |
|   X | 16 | Uimsbf |
|   Y | 16 | Uimsbf |
| } | | |

The X field contains the X coordinate of a point on the OSD 96, wherein the left-most pixel has an X value of zero and the right-most pixel has an X value of 351. The Y field contains the Y coordinate of a point on the OSD 96 wherein the top-most pixel has an Y value of zero and the bottom-most pixel has a Y value of 479.

The form table contains a FORM_DESCRIPTOR for each form element. The FORM_DESCRIPTOR contains the NAME/VALUE pair for <INPUT> tags and the ACTION URL for <FORM> tags. Note that the FORM_DESCRIPTOR has a different format for forms that access the Programming Guide, described below. The following table describes the content of a FORM_DESCRIPTOR:

| Syntax | No. of bits | Mnemonic |
|---|---|---|
| FORM_DESCRIPTOR( ){ | | |
|   if ((ElementType == INPUT_SUBMIT) & | | |
|   (ElementType == INPUT_RESET) & | | |
|   (ElementType == INPUT_CHECK) & | | |
|   (ElementType == INPUT_RADIO) & | | |
|   (ElementType == INPUT_TEXT) & | | |
|   (ElementType == INPUT_PASSWORD)) { | | |
|     COORD_DESCRIPTOR( ) | | |
|     COORD_DESCRIPTOR( ) | | |
|   } | | |
|   if (Element is part of a GUIDEFORM) { | | |
|     Function | 8 | Uimsbf |
|     Reserved | 8 | Uimsbf |
|     if (Function == TUNE){ | | |
|       SourceID | 16 | Uimsbf |
|       Time | 32 | Uimsbf |
|     } else { | | |
|       COORD_DESCRIPTOR( ) | | |
|       COORD_DESCRIPTOR( ) | | |
|     } | | |
|   } else { | | |
|     NameLength | 8 | Uimsbf |
|     ValueLength | 8 | Uimsbf |
|     for (i=0;i<NameLength;i++){ | | |
|       Name[i] | 8 | Uimsbf |
|     } | | |
|     for (i=0;Value[i];i++){ | | |

-continued

| Syntax | No. of bits | Mnemonic |
|---|---|---|
|     Value[i] | 8 | Uimsbf |
|    } | | |
|  } | | |
| } | | |

The COORD_DESCRIPTORS carry the geometry necessary to support certain form <INPUT> elements. The interpretation of these fields depends upon the type of the form element, as set forth in the following table, which shows the interpretation of these COORD_DESCRIPTORS for each type of form input element:

| Element Type | Coord1 | Coord2 |
|---|---|---|
| INPUT_SUBMIT | Button Upper Left | Button Lower Right |
| INPUT_CHECK | Check Upper Left | |
| INPUT_RADIO | Check Upper Left | |
| INPUT_TEXT | TextBox Upper Left | TextBox Lower Right |
| INPUT_PASSWORD | TextBox Upper Left | TextBox Lower Right |
| INPUT_RESET | Button Upper Left | Button Lower Right |

The Function field contains the function code for the programming guide function referenced by the GUIDEFORM. The following table shows the encoding used for each of the guide functions:

| Function | Function Code |
|---|---|
| TUNE | 0 |
| REC | 1 |
| HELO | 2 |
| QUIT | 3 |
| DATE | 4 |
| FROM | 5 |
| SUBJ | 6 |
| BODY | 7 |
| ACKS | 8 |
| ACKD | 9 |
| ACKB | 10 |

Following a reserved field, the SourceID field contains a unique identifier of a program. The time field contains a Time value, wherein a zero indicates that the time should be treated as the current time.

The COORD_DESCRIPTORS for guide form elements are used to indicate where text should be drawn. The first coordinate specifies the upper left pixel of a region. The second coordinate specifies the lower right pixel of a region. The COORD_DESCRIPTORS are valid for the DATE, FROM, SUBJ and BODY guide functions.

The NameLength field contains the length of a Name string in ASCII characters, wherein a length of zero indicates that the string is not present. The ValueLength field contains the length of the Value string in ASCII characters, wherein a length of zero indicates that the string is not present. The Name[ ] field contains the ASCII Name string, if present. For form <INPUT> elements, the Name string contains the string specified by the NAME attribute. For the <FORM> element, the Name string contains the URL string specified by the ACTION attribute.

Similarly, the Value[ ] field contains the ASCII Value string. For form <INPUT> elements, the Name string contains the string specified by the VALUE attribute. For the <FORM> element, the Value string contains the method string specified by the METHOD attribute.

The following table sets forth the use of the fields within the FORM_DESCRIPTOR for other types of form elements:

| Element Type | Coord1 | Coord2 | Name | Value |
|---|---|---|---|---|
| FORM | | | Rvalue(ACTION=) | Rvalue(METHOD=) |
| AUTOFORM | | | Rvalue(ACTION=) | Rvalue(METHOD=) |
| INPUT_IMAGE | | | Rvalue(NAME=) | Rvalue(VALUE=) |
| INPUT_HIDDEN | | | Rvalue(NAME=) | Rvalue(VALUE=) |
| INPUT_SUBMIT | ButtonUL | ButtonLR | Rvalue(NAME=) | Rvalue(VALUE=) |
| INPUT_CHECK | CheckUL | | Rvalue(NAME=) | Rvalue(VALUE=) |
| INPUT_RADIO | CheckUL | | Rvalue(NAME=) | Rvalue(VALUE=) |
| INPUT_TEXT | TextBoxUL | TextBoxLR | Rvalue(NAME=) | |
| INPUT_PASSWORD | TextBoxUL | TextBoxLR | Rvalue(NAME=) | |
| INPUT_RESET | ButtonUL | ButtonLR | | |

VI. Page Authoring

Figure 12:
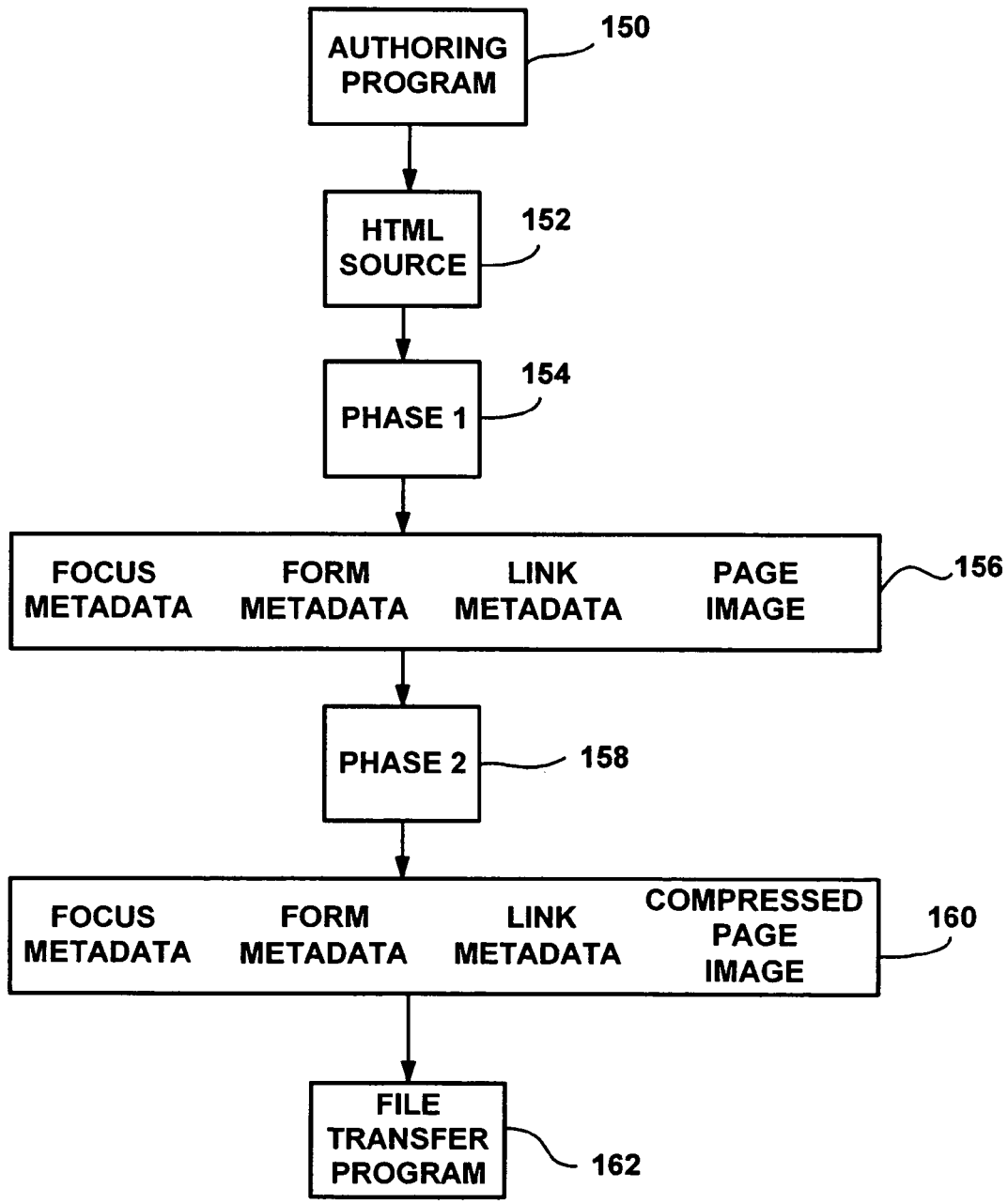
FIG. 12 is a block diagram representing the authoring of a page for the information service.

Turning to a consideration of how the page images are generated, FIG. 12 shows the general flow of one such image from authoring to downloading. First, an author creates a page using standard HTML content creation tools, such as provided in an HTML-ready authoring program 150. Such authoring programs using standard content creation tools are well known and will not be described in detail herein. However, because the pages are to be viewed on a television, the author should take care to create an HTML page suitable for television viewing. For example, the author should select font styles and sizes appropriate for television display, and avoid color and luminance transitions which generate dot-crawl. Indeed, the author may wish to view a close approximation of the ultimately resulting page by using a VGA to NTSC converter with underscan and antiflicker filtering enabled. In any event, as shown in FIG. 12, an HTML source 152 including an HTML document and associated image files is provided.

After the author is satisfied with the initial result, the author runs a Phase 1 post-processing tool 154, which performs a number of operations on the HTML source 152. Such a tool includes the operations of rendering the page at a 640 by 480 resolution and vertically scaling the page such that the full 640 by 480 image resides within the SMPTE safe action area of a 704 by 480 overscanned television raster (approximately 640 by 432). The scaled page image is bordered by black. In addition, the rendered page is vertically filtered to reduce interlace flicker, and horizontally filtered to reduce cross-luma and chross-chroma interference artifacts.

In phase one processing, the meta-data that define how focus should be drawn on links and form elements are inferred by the HTML layout. The focus geometry is specified on a 352 by 480 grid that overlays the 704 by 480 page image. In other words, only even pixel addresses are allowed in focus specifications. The meta-data that contain the name of the HTML pages associated with each link are inferred from the HTML source 152, as are meta-data that describe any forms. The meta-data defining the focus geometry and link URLs are encoded using standard client-side image map tags, i.e., <AREA>. The HREF attribute for entries relating to form element focus will contain the URL specified by the ACTION attribute in the <FORM> tag. Appended to that URL will be the form query string fragment defined by that form element. The HREF attribute for hyperlinks will contain the URL from the corresponding anchor or imagemap.

The output 156 of this first phase includes a true color bitmap (.BMP) file containing the processed page image and an HTML file that contains the original HTML source encapsulated in a <META> tag. Also contained are the original image files encapsulated in a <META> tag, a client-side imagemap that is the processed page image, wherein the name of the image file is identical to the name of the HTML source file, and a <MAP> tag defining the geometry of focus for all page elements that can receive focus including form elements. The HTML file also contains the meta-data for the page encapsulated in a <META> tag, and the meta-data for each page element encapsulated in a <META> tag.

Since all focus geometry is specified using standard client-side image map syntax, the author can use standard imagemap editing tools to change the focus geometry if desired. Moreover, since the page image is output as a true color .BMP file, the author can make any necessary changes to the image using standard image editing tools. Note that if desired, the anti-flicker, cross-luma, and cross-chroma filtering may be postponed to the next phase (described below).

The order of the <AREA> tags in the <MAP> tag determines the focus chain. As a result, it is possible to edit the Focus Chain for a page at this stage in order to achieve results that cannot be generated simply in the HTML source 152. For example, the author may change the focus chain order by changing the order in which these tags occur, since the first <AREA> tag defines where focus is initially drawn when the page is displayed.

After the author is satisfied with the focus geometry, focus chain order and the final page image, a phase2 post-processing tool 158 is run. The phase2 tool 158 performs a number of operations, including coding the page image as a single MPEG I-Frame, and processing the <MAP> tag to generate focus descriptors for each page element. The focus descriptors for each page element are combined with the other meta-data for each page element.

The output of this second phase is a single HTML file 160 containing a number of items encapsulated in a <META> tag, including the original HTML source, the original image files, the processed page image and the compressed page image. Also contained in the file 160 are the meta-data for the page and the meta-data for each page element therein. After phase2 processing, the page is in the intermediate page format (described above), and the author provides the final file to the carousel building tool 146, such as by running a file transfer program 162 to transfer the file via the Internet 48 to the server 46 of the Information Service.

Note that the phase1 and phase2 processes (154 and 158, respectively) can be run back-to-back without intervention. The break exists therebetween to provide authors the ability to exercise more control over the process if so desired. Thus, as described above, between phase1 154 and phase2 158 of the tool chain, an author may edit the focus geometry by using any number of existing imagemap editing tools, while the focus chain may also be edited by editing the FOCUS meta-data.

To allow the HTML author to reference user-specific data stored in the set-top-box 28 and perform other limited functions, a set of form element names are defined to have special meanings, as set forth in the table below:

| Element name | Meaning and usage | Format |
| --- | --- | --- |
| _SHIPNAME | Default shipping name. May be used for transactions and bingo card. | |
| _SHIPSTREET | | |
| _SHIPCITY | | |
| _SHIPSTATE | | |
| _SHIPZIP | | |
| _CARDNAME | Default cardholder name. May be used for one-button purchase. | |
| _CARDTYPE | | |
| _CARDMONTH | | |
| _CARDYEAR | | |
| _EMAIL | Default Email address for this box. | Standard RFC822 address syntax. |
| _TIME | Current time. | |
| _QUANTITY | Name to use for quantity input on transaction form in order to enable _TOTAL. | |
| _PRICE | Name to use for price hidden text on transaction form in order to enable _TOTAL | |
| _SANDH | Name to use for shipping and handling etc hidden text on transaction form if needed for _TOTAL | |
| _TOTAL | Causes the Browser 62 to evaluate the following expression that can be placed in a read-only text entry element. _TOTAL = _QUANTITY * _PRICE + _SANDH | |

When included in the body of a form as hidden text, these elements generate a standard name/value pair in the form query string. For example, the tag <INPUT TYPE=HIDDEN NAME="_EMAIL"> will generate the following sub-string in the form query string: "&_EMAIL=set_top_box_name@customers.tci.com"

VII. Other

At least some existing programming guide applications and cable system infrastructures support one-way e-mail broadcasts to all users. This function can be extended to allow one-way e-mail to a specific subscriber, using the existing (e.g. PreVue) e-mail notification and display mechanism. E-mail data can be sent to a specific set-top box via the out-of-band modulator 60 (FIG. 2) and the out-of-band tuner 71 (FIG. 3), in the same manner that a specific box is enabled for receiving a pay-per-view movie. Although not directly linked to the Information Service architecture, a head-end e-mail server is considered a part of the Information Service head-end installation, and the e-mail server software is supplied by the assignee of the present invention.

The Information Service e-mail client is implemented using standard HTML forms. A simple example would be a form containing buttons for "Previous", "Next", and "Delete" which would submit the appropriate query strings to the guide in order to have the mail text rendered using the OSD 96 over the page image. The author of the page can specify where the "From" address is rendered and where the message text is rendered. The coordinates for these fields are referenced to a 352 by 480 OSD grid, where the original 640 by 480 page image underlays the center 320 by 432 pixels.

Although at present e-mail is generally read-only, it is understood that two-way e-mail is feasible. For example, outgoing e-mail messages may be written to the memory 82 and polled via the modem 134 (FIG. 3) by an e-mail server or the like, or sent directly (or as soon as a telephone line is available) thereto via the modem 134 upon user command. Moreover, a backchannel which sends information on the transmission medium 24 from the various set-top boxes back to the head-end 22 may be dedicated, in which event all data, including form entry data and e-mail data, can be immediately transferred without polling the modem 134. However, in order for e-mail to be practical, a more sophisticated alphanumeric input device, such as a conventional QWERTY keyboard arranged for communicating with the set-top box, would likely need to be provided.

It is also feasible to add audio to the carousel 50, whereby audio may be optionally played while the user is in the Information Service. In such a system, part of the information sent with each transmitted page is the next block (or blocks, if multiple, user-selectable audio streams are transmitted) of encoded audio data. Depending on the amount of memory in the set-top box, the audio data may be buffered so as to load more than one carousel revolution's worth (e.g. eight seconds) of audio data from a given carousel 50 into the set-top box 28 for each stream. However, by regularly changing the carousel, the audio may be a real-time broadcast.

Lastly, instead of a carousel 50, it is feasible to have the server 46 execute a program that selectively injects the pages into the transport stream. For example, based on statistical information such as page popularity in conjunction with the time of day, (information which may be sampled and polled from the set-top box 28), more popular pages can be injected more frequently into the stream than less popular pages. The maximum latency for a given page can thus be controlled, without effecting the total number of pages possible, (which occurs with a carousel by increasing a page's frequency in the carousel at the expense of decreasing the number of distinct pages therein).

As can be seen from the foregoing detailed description, there is provided an interactive entertainment and information system using a cable television set-top box, wherein existing digital set top boxes may be used without need for modification of the hardware therein. The system enables a user to hyperlink between pages of information, and facilitates an interactive relationship between transmitted programming and information pages related thereto. The user may submit form information, including forms related to a viewed television program. The system provides a simple to operate, low cost information service, while being flexible and extensible.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. In an audiovideo data transmission environment comprising a server source and at least one client receiver, a method comprising:

transmitting a stream of video data from the server source to a client receiver for display, including transmitting a plurality of cycles of a carousel periodically injected into the stream, each cycle of the carousel including a plurality of pages of image data and metadata stored in a plurality of locations of the carousel; and for one or more cycles of the carousel, the server source inserting at least one new page of image data different from at least one old page of image data of a previous cycle, wherein the at least one new page of image data is stored in a location of the carousel corresponding to a location of the at least one old page of image data, thereby controlling at the server source a slide show from the perspective of the client receiver, wherein the slide show comprises a series of pages of image data that are sequentially and automatically displayed at the client receiver.

2. The method of claim 1 wherein a displayed slideshow page includes an automatic link to itself such that the client receiver reacquires page metadata for display of the new page of image data.

* * * * *